(12) United States Patent
Blankstein et al.

(10) Patent No.: US 11,113,677 B1
(45) Date of Patent: Sep. 7, 2021

(54) DATA PROCESSING USING PROOF-OF-TRANSFER

(71) Applicant: Hiro Systems PBC, New York, NY (US)

(72) Inventors: Aaron Blankstein, Chicago, IL (US); Muneeb Ali, Brooklyn, NY (US); Michael J. Freedman, Princeton, NJ (US); Diwaker Gupta, Brooklyn, NY (US); Jude Nelson, New Brunswick, NJ (US); Jesse Soslow, Brooklyn, NY (US); Patrick Stanley, Los Angeles, CA (US)

(73) Assignee: Hiro Systems PBC, New York, NY (US)

( * ) Notice: Subject to any disclaimer, the term of this patent is extended or adjusted under 35 U.S.C. 154(b) by 0 days.

(21) Appl. No.: 17/142,057

(22) Filed: Jan. 5, 2021

Related U.S. Application Data

(60) Provisional application No. 62/961,069, filed on Jan. 14, 2020, provisional application No. 62/971,159, (Continued)

(51) Int. Cl.
 *G06Q 20/06* (2012.01)
 *G06Q 20/36* (2012.01)
 *H04L 9/06* (2006.01)
 *H04L 9/32* (2006.01)
 *G06F 11/18* (2006.01)
 (Continued)

(52) U.S. Cl.
 CPC ......... *G06Q 20/0658* (2013.01); *G06F 11/07* (2013.01); *G06F 11/183* (2013.01); *G06F 11/184* (2013.01); *G06F 16/2379* (2019.01); *G06F 16/27* (2019.01); *G06Q 20/3678* (2013.01); *H04L 9/0618* (2013.01); (Continued)

(58) Field of Classification Search
 CPC ........... G06Q 20/0658; G06Q 20/3672; G06Q 20/3678; H04L 9/3255; H04L 9/0618; H04L 2209/38
 See application file for complete search history.

(56) References Cited

U.S. PATENT DOCUMENTS

| | | | |
|---|---|---|---|
| 10,698,728 B1 | 6/2020 | Nelson | |
| 2017/0236123 A1* | 8/2017 | Ali | G06Q 20/3825 705/75 |

(Continued)

OTHER PUBLICATIONS

Bagaria, V., Kannan, S., Tse, D., Fanti, G., & Viswanath, P. (2019). Prism. Proceedings of the 2019 ACM SIGSAC Conference on Computer and Communications Security, https://doi.org/10.1145/3319535.3363213 (Year: 2019).*

(Continued)

*Primary Examiner* — John W Hayes
*Assistant Examiner* — Dennis G Keritsis
(74) *Attorney, Agent, or Firm* — Knobbe Martens Olson & Bear LLP

(57) ABSTRACT

An improved blockchain implementation that uses proof-of-transfer to overcome the technical deficiencies of proof of work and proof-of-stake implementations is described herein. For example, the proof-of-transfer process may include elements of a single-leader election sortition, but modified to cause base chain cryptocurrency committed for the purposes of the sortition to be transferred to a burn address or at least one reward address.

20 Claims, 14 Drawing Sheets

Related U.S. Application Data filed on Feb. 6, 2020, provisional application No. 63/024,100, filed on May 13, 2020.

(51) Int. Cl.
    *G06F 16/27*     (2019.01)
    *G06F 16/23*     (2019.01)
    *G06F 11/07*     (2006.01)

(52) U.S. Cl.
    CPC ........ *G06Q 20/3672* (2013.01); *H04L 9/3255* (2013.01); *H04L 2209/38* (2013.01)

(56) References Cited

U.S. PATENT DOCUMENTS

| | | | |
|---|---|---|---|
| 2019/0172026 A1 | 6/2019 | Vessenes et al. | |
| 2019/0236598 A1* | 8/2019 | Padmanabhan | G06Q 20/4016 |
| 2021/0026740 A1 | 1/2021 | Guo et al. | |
| 2021/0042745 A1* | 2/2021 | Bartolucci | H04L 9/3239 |

OTHER PUBLICATIONS

Daian, P. Pass, R., & Shi, E. (2019). Snow White: Robustly Reconfigurable Consensus and Applications to Provably Secure Proof of Stake. Financial Cryptography and Data Security, 23-41. https://doi.org/10.1007/978-3-030-32101-7_2 (Year: 2019).*

Muneeb, A. (2017). Trust to Trust Design of a New Internet. (Year: 2017).*

Ren, L., & Devadas, S. (2016). Proof of Space from Stacked Expanders. Theory of Cryptography, 262-285. https://doi.org/10.1007/978-3-662-53641-4_11 (Year: 2019).*

Xiao, Y., Zhang, N., Li, J., Lou, W., & Hou, Y. T. (2019). Distributed Consensus Protocols and Algorithms. Blockchain for Distributed Systems Security, 25-50. https://doi.org/10.1002/9781119519621.ch2 (Year: 2019).*

Yaga, D., Mell, P. Roby, N., & Scarfone, K. (2018). Blockchain technology overview. https://doi.org/10.6028/nist.ir.8202 (Year: 2018).*

Ali, Muneeb, Dissertation, Trust-to-Trust Design of a New Internet, dated Jun. 2017.

Ali, Muneeb et al., Blockstack: A New Decentralized Internet, dated May 2017.

Ali, Muneeb et al., Blockstack: A New Internet for Decentralized Applications, dated Oct. 2017.

Ali, Muneeb et al., Blockstack: A Global Naming and Storage System Secured by Blockchains. In Proceedings of the 2016 USENIX Annual Technical Conference, Jun. 2016.

Ali, Muneeb et al., Bootstrapping Trust in Distributed Systems with Blockchains. In USENIX ;login 41(3):52-58, Fall 2016.

Ali, Muneeb et al., The Blockstack Decentralized Computing Network, dated May 30, 2019.

Nelson, Jude et al., Extending Existing Blockchains with Virtualchain. In Workshop on Distributed Cryptocurrencies and Consensus Ledgers, 2016.

Nelson, Jude, Dissertation: Wide-Area Software-Defined Storage, dated Jun. 2018.

\* cited by examiner

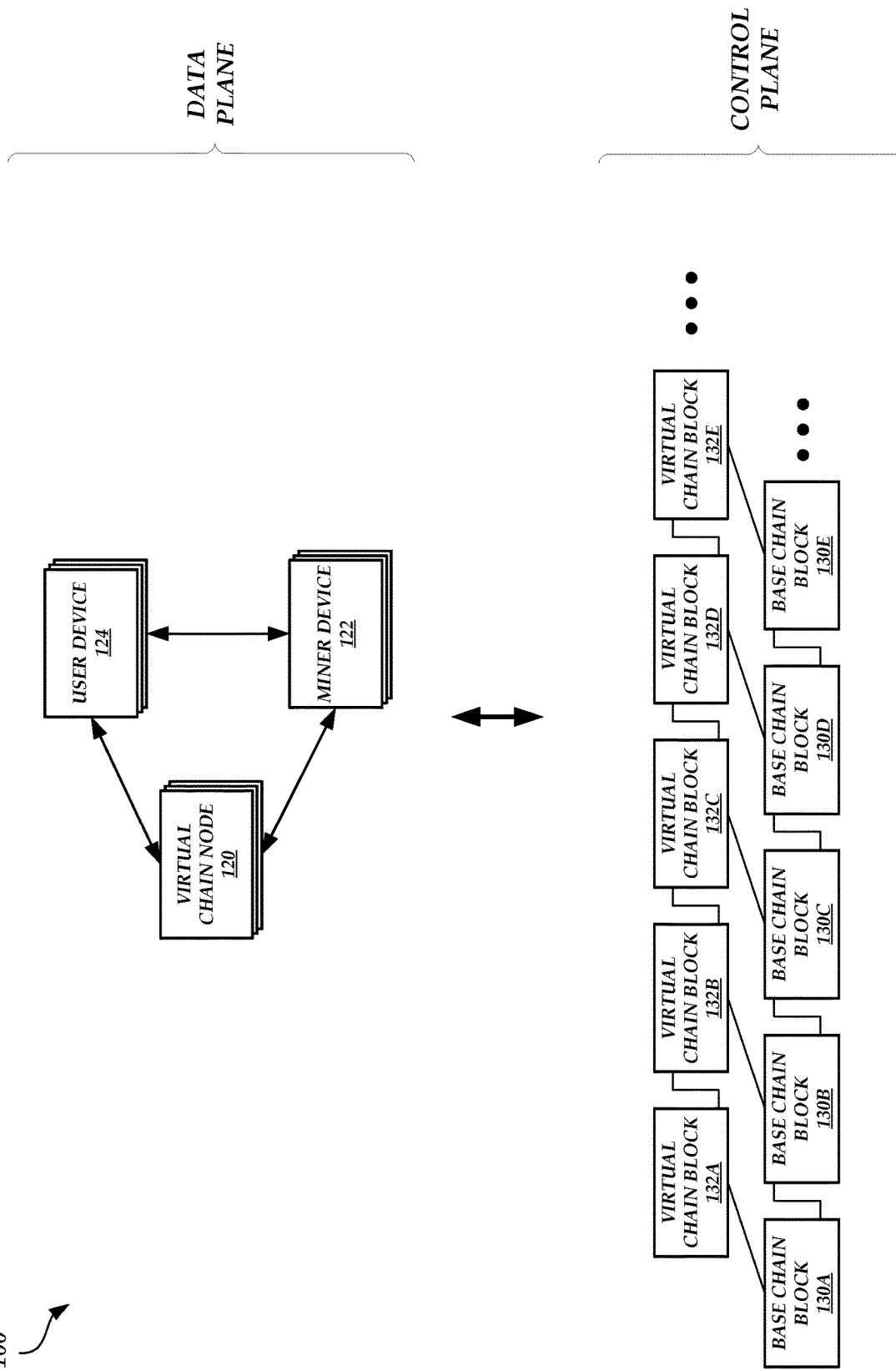

DATA PROCESSING USING PROOF-OF-TRANSFER

CROSS-REFERENCE TO RELATED APPLICATIONS

This application claims priority under 35 U.S.C. § 119(e) to U.S. Provisional Patent Application No. 62/961,069, entitled "STACKING CONSENSUS" and filed on Jan. 14, 2020, to U.S. Provisional Patent Application No. 62/971, 159, entitled "PROOF OF TRANSFER MINING WITH BITCOIN" and filed on Feb. 6, 2020, and to U.S. Provisional Patent Application No. 63/024,100, entitled "PROOF OF TRANSFER MINING WITH BITCOIN" and filed on May 13, 2020, the entire disclosures of which are hereby incorporated by reference herein. This application is also being filed on Jan. 5, 2021, the same date as U.S. patent application Ser. No. 17/142,039, which is hereby incorporated by reference herein in its entirety. Any and all applications, if any, for which a foreign or domestic priority claim is identified in the Application Data Sheet of the present application are hereby incorporated by reference in their entireties under 37 CFR 1.57.

BACKGROUND

A blockchain is a distributed ledger that can be used to record transactions and reduce the likelihood that recorded transactions are altered retroactively. Generally, a blockchain can be implemented within a peer-to-peer network. Computing devices participating in the peer-to-peer network can each include a copy of the blockchain and broadcast transactions to other computing devices participating in the peer-to-peer network.

The blockchain itself can include a chain of blocks that are linked together cryptographically, with each block in the chain storing one or more transactions and the number of blocks in the chain growing over time. For example, a transaction can include a cryptocurrency payment, execution of a smart contract, submission of an online vote, and/or any other type of exchange or event. The blocks can be linked together using a cryptographic hash. For example, each block can include a cryptographic hash of a previous block in the chain. Because each block includes a cryptographic hash of a previous block in the chain, a transaction stored in one block cannot be altered without all subsequent blocks being altered as well. The likelihood that all subsequent blocks being altered is low given that such an alteration would require approval from a majority of the computing devices or participants participating in the blockchain.

SUMMARY

The systems, methods, and devices described herein each have several aspects, no single one of which is solely responsible for its desirable attributes. Without limiting the scope of this disclosure, several non-limiting features will now be discussed briefly.

One aspect of the disclosure provides a computing device of a decentralized network. The computing device comprises a network interface configured to couple the computing device to the decentralized network. The computing device further comprises a hardware processor. The computing device further comprises a non-transitory computer readable storage medium storing program instructions for execution by the hardware processor in order to cause the computing device to: identify, in association with a prepare phase, an anchor block in a virtual chain, where blocks in the virtual chain are anchored to blocks in a base chain, where the prepare phase corresponds with a first set of blocks in the base chain, and where the anchor block is a block in the base chain; determine, in association with the prepare phase, a set of reward addresses to receive at least some cryptocurrency in a plurality of cryptocurrency associated with the base chain during a reward phase that follows the prepare phase, where the reward phase corresponds with a second set of blocks in the base chain created after the first set of blocks in the base chain; store, during the reward phase, data indicating that first cryptocurrency in the plurality of cryptocurrency associated with the base chain is transferred from an address of a miner device to at least one reward address in the set of reward addresses in response to a determination that the miner device submitted a block commit transaction that references a first block in the virtual chain that descends from the anchor block; and perform, during the reward phase, a single-leader sortition that results in a selection of the miner device to create a second block in the virtual chain based at least in part on the block commit transaction.

The computing device of the preceding paragraph can include any sub-combination of the following features: where the program instructions, when executed, further cause the computing device to store, during the reward phase, second data indicating that second cryptocurrency in the plurality of cryptocurrency associated with the base chain is transferred from an address of a second miner device to a burn address in response to a determination that the second miner device submitted a second block commit transaction that references a third block in the virtual chain that does not descend from the anchor block; where transfer of the second cryptocurrency from the address of the second miner device to the burn address results in the second cryptocurrency being destroyed; where the program instructions, when executed, further cause the computing device to remove the at least one reward address in the set of reward addresses from the set of reward addresses to form a modified set of reward addresses; where the program instructions, when executed, further cause the computing device to store, during the reward phase, second data indicating that second cryptocurrency in the plurality of cryptocurrency associated with the base chain is transferred from an address of a second miner device to at least one reward address in the modified set of reward addresses in response to a determination that the second miner device submitted a second block commit transaction that references a third block in the virtual chain that descends from the anchor block; where the program instructions, when executed, further cause the computing device to process a participant transaction broadcast by a user device over the decentralized network prior to the prepare phase, where the participant transaction comprises an indication of a base chain address and a first amount of cryptocurrency associated with the virtual chain; where the program instructions, when executed, further cause the computing device to add the base chain address to the set of reward addresses in response to a determination that the first amount of cryptocurrency is greater than a threshold percentage of a total amount of cryptocurrency associated with the virtual chain held by participants in the decentralized network; where the program instructions, when executed, further cause the computing device to perform a second single-leader sortition to select the at least one reward address in the set of reward addresses; and where the program instructions, when executed, further cause the computing device to identify the anchor block after a last block in the first set of blocks in the base chain is created by a second miner device.

Another aspect of the disclosure provides a computer-implemented method comprising: under control of a computing device in a decentralized network, identifying, in association with a prepare phase, an anchor block in a virtual chain, where blocks in the virtual chain are anchored to blocks in a base chain, where the prepare phase corresponds with a first set of blocks in the base chain, and where the anchor block is a block in the virtual chain created prior to initiation of the prepare phase; determining, in association with the prepare phase, a set of reward addresses to receive at least some cryptocurrency in a plurality of cryptocurrency associated with the base chain during a reward phase that follows the prepare phase, where the reward phase corresponds with a second set of blocks in the base chain created after the first set of blocks in the base chain; storing, during the reward phase, data indicating that first cryptocurrency in the plurality of cryptocurrency associated with the base chain is transferred from an address of a miner device to at least one reward address in the set of reward addresses in response to a determination that the miner device submitted a block commit transaction that references a first block in the virtual chain that descends from the anchor block; and performing, during the reward phase, a single-leader sortition that results in a selection of the miner device to create a second block in the virtual chain based at least in part on the block commit transaction.

The computer-implemented method of the preceding paragraph can include any sub-combination of the following features: where the computer-implemented method further comprises storing, during the reward phase, second data indicating that second cryptocurrency in the plurality of cryptocurrency associated with the base chain is transferred from an address of a second miner device to a burn address in response to a determination that the second miner device submitted a second block commit transaction that references a third block in the virtual chain that does not descend from the anchor block; where transfer of the second cryptocurrency from the address of the second miner device to the burn address results in the second cryptocurrency being destroyed; where the computer-implemented method further comprises removing the at least one reward address in the set of reward addresses from the set of reward addresses to form a modified set of reward addresses; where the computer-implemented method further comprises storing, during the reward phase, second data indicating that second cryptocurrency in the plurality of cryptocurrency associated with the base chain is transferred from an address of a second miner device to at least one reward address in the modified set of reward addresses in response to a determination that the second miner device submitted a second block commit transaction that references a third block in the virtual chain that descends from the anchor block.

Another aspect of the disclosure provides non-transitory, computer-readable storage media comprising computer-executable instructions for implementing proof-of-transfer in a blockchain, where the computer-executable instructions, when executed by a computer system, cause the computer system to: identify, in association with a prepare phase, an anchor block in a virtual chain, where blocks in the virtual chain are anchored to blocks in a base chain, where the prepare phase corresponds with a first set of blocks in the base chain, and where the anchor block is a block in the virtual chain created prior to initiation of the prepare phase; determine, in association with the prepare phase, a set of reward addresses to receive at least some cryptocurrency in a plurality of cryptocurrency associated with the base chain during a reward phase that follows the prepare phase, where the reward phase corresponds with a second set of blocks in the base chain created after the first set of blocks in the base chain; store, during the reward phase, data indicating that first cryptocurrency in the plurality of cryptocurrency associated with the base chain is transferred from an address of a miner device to at least one reward address in the set of reward addresses in response to a determination that the miner device submitted a block commit transaction that references a first block in the virtual chain that descends from the anchor block; and perform, during the reward phase, a single-leader sortition that results in a selection of the miner device to create a second block in the virtual chain.

The non-transitory, computer-readable storage media of the preceding paragraph can include any sub-combination of the following features: where the computer-executable instructions further cause the computer system to store, during the reward phase, second data indicating that second cryptocurrency in the plurality of cryptocurrency associated with the base chain is transferred from an address of a second miner device to a burn address in response to a determination that the second miner device submitted a second block commit transaction that references a third block in the virtual chain that does not descend from the anchor block; where transfer of the second cryptocurrency from the address of the second miner device to the burn address results in the second cryptocurrency being destroyed; where the computer-executable instructions further cause the computer system to remove the at least one reward address in the set of reward addresses from the set of reward addresses to form a modified set of reward addresses; where the computer-executable instructions further cause the computer system to store, during the reward phase, second data indicating that second cryptocurrency in the plurality of cryptocurrency associated with the base chain is transferred from an address of a second miner device to at least one reward address in the modified set of reward addresses in response to a determination that the second miner device submitted a second block commit transaction that references a third block in the virtual chain that descends from the anchor block; and where the computer-executable instructions further cause the computer system to perform a second single-leader sortition to select the at least one reward address in the set of reward addresses.

Another aspect of the disclosure provides a computing device of a decentralized network comprising a network interface configured to couple the computing device to the decentralized network. The computing device further comprises a hardware processor. The computing device further comprises a non-transitory computer readable storage medium storing program instructions for execution by the hardware processor in order to cause the computing device to: process a participant transaction broadcast over the decentralized network, where the participant transaction comprises an indication of a block height of a base chain and an address associated with the base chain, where blocks in a virtual chain are anchored to blocks in the base chain; identify an anchor block in the virtual chain based on virtual chain block data and the indication of the block height of the base chain; identify a set of reward addresses based at least in part on the address associated with the base chain included in the participant transaction; process a block commit transaction broadcast over the decentralized network that indicates an amount of cryptocurrency associated with the base chain to transfer; store data indicating that the cryptocurrency associated with the base chain is transferred from an address of a miner device to one of a burn address or a first reward address in the set of reward addresses that is selected based on the identified anchor block; and perform the single-leader sortition using at least the block commit transaction to select a second miner device to create a first block in the virtual chain.

The computing device of the preceding paragraph can include any sub-combination of the following features: where the program instructions, when executed, further cause the computing device to process a second block commit transaction broadcast over the decentralized network that indicates a second amount of cryptocurrency associated with the base chain to transfer; where the program instructions, when executed, further cause the computing device to: store data indicating that the second amount of cryptocurrency associated with the base chain is transferred from an address of the second miner device to the burn address in response to a determination that the second block commit transaction references a second block in the virtual chain that does not descend from the identified anchor block, and perform the second single-leader sortition to select a third miner device to create a third block in the virtual chain based at least in part on the second block commit transaction; where transfer of the second amount of cryptocurrency from the address of the second miner device to the burn address results in the second amount of cryptocurrency being destroyed; where the program instructions, when executed, further cause the computing device to store data indicating that the second amount of cryptocurrency associated with the base chain is transferred from an address of the second miner device to a second reward address in the set of reward addresses in response to a determination that the second block commit transaction references a second block in the virtual chain that descends from the identified anchor block; where the program instructions, when executed, further cause the computing device to perform a third single-leader sortition to select the second reward address in the set of reward addresses; where the program instructions, when executed, further cause the computing device to: obtain the virtual chain block data, where the virtual chain block data corresponds to one or more blocks in the virtual chain created prior to the single-leader sortition being performed, for each one of the one or more blocks in the virtual chain, identify an ancestor block of the respective block that was created prior to the earliest block in the one or more blocks in the virtual chain, determine that a first ancestor block in the identified ancestor blocks is identified as an ancestor block more often than the other identified ancestor blocks in the identified ancestor blocks, and identify the first ancestor block as the anchor block based at least in part in response to a determination that the first ancestor block is identified as an ancestor block for a threshold percentage of the one or more blocks in the virtual chain created prior to the single-leader sortition being performed and descends from one or more blocks in the virtual chain that store a second threshold percentage of the participant transaction and other participant transactions that satisfy a recency threshold determined by a current block height of the base chain; where the participant transaction further comprises an indication of a first amount of cryptocurrency associated with the virtual chain being locked up for a period of time; where the program instructions, when executed, further cause the computing device to add the address associated with the base chain included in the participant transaction to the set of reward addresses in response to a determination that the first amount of cryptocurrency is greater than a threshold percentage of a total amount of cryptocurrency associated with the virtual chain held by participants in the decentralized network; and where the program instructions, when executed, further cause the computing device to identify the anchor block and identify the set of reward addresses prior to performing the single-leader sortition and a plurality of additional single-leader sortitions.

Another aspect of the disclosure provides a computer-implemented method comprising: under control of a computing device in a decentralized network, receiving a participant transaction broadcast over the decentralized network, where the participant transaction comprises an indication of a block height of a base chain and an address associated with the base chain, where blocks in a virtual chain are anchored to blocks in the base chain; identifying an anchor block in the virtual chain based on virtual chain block data and the indication of the block height of the base chain; identifying a set of reward addresses based at least in part on the address associated with the base chain included in the participant transaction; processing a block commit transaction broadcast over the decentralized network that indicates an amount of cryptocurrency associated with the base chain to transfer; storing data indicating that the cryptocurrency associated with the base chain is transferred from an address of a miner device to one of a burn address or a first reward address in the set of reward addresses that is selected based on the identified anchor block; and performing the single-leader sortition using at least the block commit transaction to select a second miner device to create a first block in the virtual chain.

The computer-implemented method of the preceding paragraph can include any sub-combination of the following features: where the computer-implemented method further comprises receiving a second block commit transaction broadcast over the decentralized network that indicates a second amount of cryptocurrency associated with the base chain to transfer; where the computer-implemented method further comprises storing data indicating that the second amount of cryptocurrency associated with the base chain is transferred from an address of the second miner device to the burn address in response to a determination that the second block commit transaction references a second block in the virtual chain that does not descend from the identified anchor block, and performing the second single-leader sortition to select a third miner device to create a third block in the virtual chain based at least in part on the second block commit transaction; where the computer-implemented method further comprises storing data indicating that the second amount of cryptocurrency associated with the base chain is transferred from an address of the second miner device to a second reward address in the set of reward addresses in response to a determination that the second block commit transaction references a second block in the virtual chain that descends from the identified anchor block; and where the computer-implemented method further comprises performing a third single-leader sortition to select the second reward address in the set of reward addresses.

Another aspect of the disclosure provides non-transitory, computer-readable storage media comprising computer-executable instructions for implementing proof-of-transfer in a blockchain, where the computer-executable instructions, when executed by a computer system, cause the computer system to: process a participant transaction broadcast over the decentralized network, where the participant transaction comprises an indication of a block height of a base chain and an address associated with the base chain, where blocks in a virtual chain are anchored to blocks in the base chain;

identify an anchor block in the virtual chain based on virtual chain block data and the indication of the block height of the base chain; identify a set of reward addresses based at least in part on the address associated with the base chain included in the participant transaction; process a block commit transaction broadcast over the decentralized network that indicates an amount of cryptocurrency associated with the base chain to transfer; store data indicating that the cryptocurrency associated with the base chain is transferred from an address of a miner device to one of a burn address or a first reward address in the set of reward addresses that is selected based on the identified anchor block; and perform the single-leader sortition using at least the block commit transaction to select a second miner device to create a first block in the virtual chain.

The non-transitory, computer-readable storage media of the preceding paragraph can include any sub-combination of the following features: where the computer-executable instructions further cause the computer system to process a second block commit transaction broadcast over the decentralized network that indicates a second amount of cryptocurrency associated with the base chain to transfer; where the computer-executable instructions further cause the computer system to: store data indicating that the second amount of cryptocurrency associated with the base chain is transferred from an address of the second miner device to the burn address in response to a determination that the second block commit transaction references a second block in the virtual chain that does not descend from the identified anchor block, and perform the second single-leader sortition to select a third miner device to create a third block in the virtual chain based at least in part on the second block commit transaction; where the computer-executable instructions further cause the computer system to store data indicating that the second amount of cryptocurrency associated with the base chain is transferred from an address of the second miner device to a second reward address in the set of reward addresses in response to a determination that the second block commit transaction references a second block in the virtual chain that descends from the identified anchor block; and where the computer-executable instructions further cause the computer system to perform a third single-leader sortition to select the second reward address in the set of reward addresses.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 1 is a block diagram of an illustrative operating environment in which an improved blockchain implements proof-of-transfer to increase blockchain security and reliability.

DETAILED DESCRIPTION OF SPECIFIC EMBODIMENTS

Figure 2A:
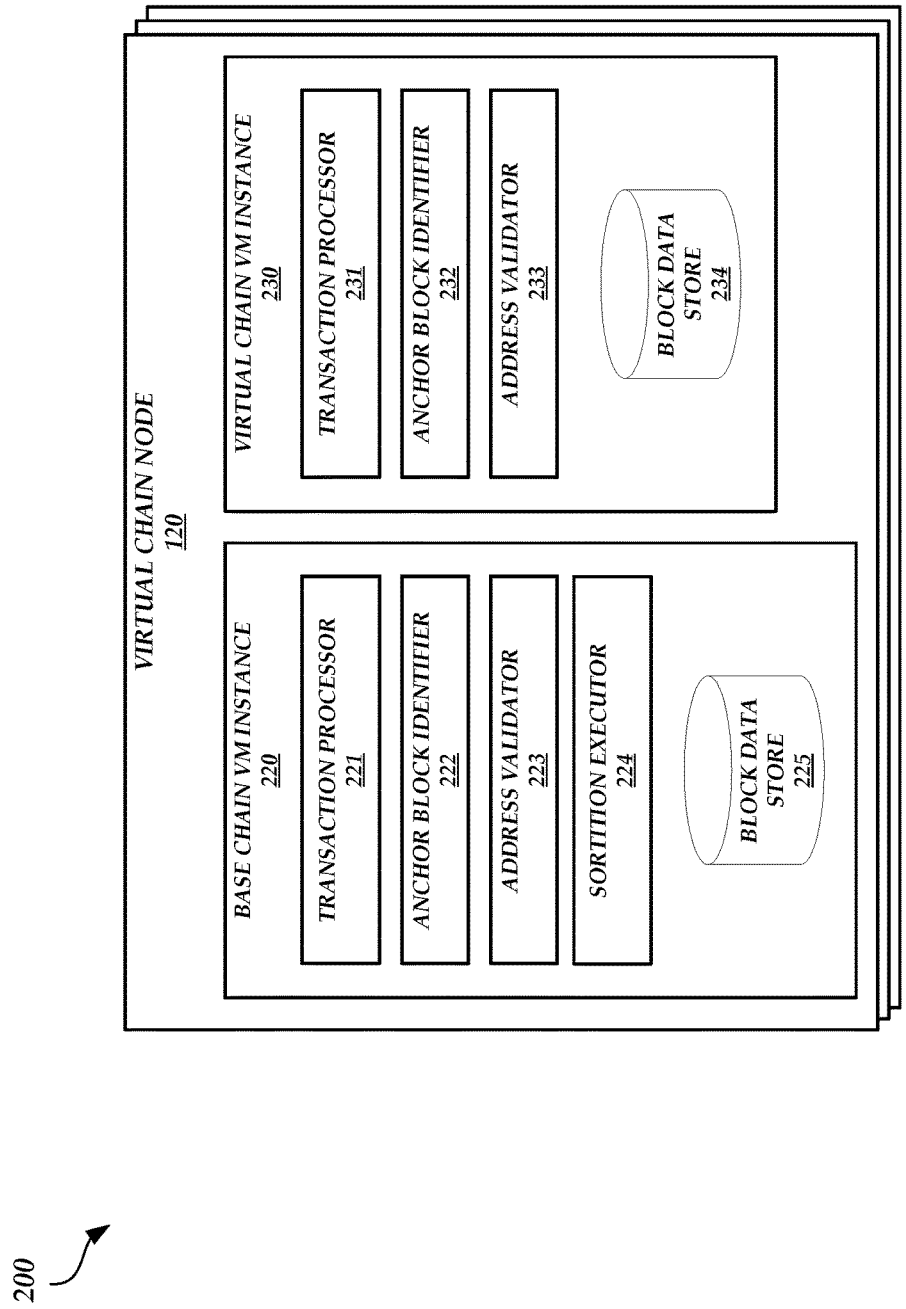
FIG. 2A is a block diagram of an illustrative operating environment in which an improved blockchain is implemented via one or more VM instances.

As described above, a blockchain is a distributed ledger that can be used to record transactions. The blockchain includes a set of blocks, the number of which grows over time. To allow the blockchain to grow, some computing devices may function as "miners," with at least one of the miners (e.g., computing devices) being selected to form a new block in the blockchain. The selected computing device may be referred to as a leader. To be considered for selection as a leader, a computing device may be required to expend resources. For example, in some conventional blockchain implementations, a computing device may be required to generate a proof of work in which the computing device is attempting to generate a hash value that is less than a target value. A computing device may have to generate multiple hash values before finding one that is less than the target value. The computing device is therefore consuming computing resources (e.g., processing resources), and ultimately energy (e.g., electricity), to find a hash value that is less than the target value.

Generally, the computing device that is first to find a hash value that is less than the target value is selected as the leader. While there is a cost associated with becoming the leader (e.g., the cost of the electricity consumed to find the hash value that is less than the target value), the computing device selected as a leader is rewarded with a block reward (e.g., cryptocurrency) and/or transaction fees. For example, as described herein, transactions are stored or encoded in blocks. To submit a transaction, a computing device (e.g., a user's wallet, a user device, etc.) may have to pay a transaction fee to the leader (e.g., computing device acting as the miner) forming the block within which the transaction is to be stored.

Relying on the proof of work to select the leader can prevent one computing device from simulating multiple computing devices in an attempt to "stuff the ballot" and become the leader of the next block in the blockchain. However, this approach can be wasteful as a high amount of energy may be consumed each time a new block is formed in the blockchain. In addition, this approach can favor computing devices that have access to a cheaper source of energy. For example, a computing device with access to a cheap source of energy may be able to generate more hashes than another computing device in an attempt to find a hash value that is less than the target value before the energy cost outweighs any transaction fees that may be garnered by being selected as the leader. Moreover, this approach can favor computing devices that have computing power (e.g., processing power) that far exceeds the computing power of other computing devices. Such computing devices may be able to generate hashes faster than other computing devices, and therefore be selected as leader more often than other computing devices.

One possible way to overcome the technical deficiencies of blockchain implementations that rely on proof of work is to implement a blockchain that relies on a proof-of-stake algorithm. For example, the proof-of-stake algorithm may involve miners staking their individual holdings of a cryptocurrency to participate in a sortition for selecting the leader of a new block in a blockchain. If a miner engages in any malicious behavior, the peers in the peer-to-peer network can penalize the miner by reducing the cryptocurrency holdings of the miner. Implementing the proof-of-stake algorithm results in miners consuming less energy (e.g., electricity) than with the proof of work algorithm, which can reduce favoritism toward computing devices that have more computing power and/or access to cheaper sources of energy. The proof-of-stake algorithm, however, lacks a mechanism that incentivizes other participants in the peer-to-peer network to initiate actions that reduce the effects of and/or reduce the likelihood of miners engaging in malicious activity, thereby improving the security and reliability of the blockchain.

Another possible way to overcome the technical deficiencies of blockchain implementations that rely on proof of work is to implement a blockchain in which a single-leader election algorithm (e.g., a single-leader sortition algorithm) is executed. For example, the single-leader election algorithm may include a series of rounds, where at most one miner (e.g., a computing device participating in the peer-to-peer network that is acting as a miner) is selected as a leader in each round and the selected leader is able to form a new block in the blockchain (also referred to herein as the "stacks chain" or the "virtual chain"). The single-leader election is not an election in which there are votes, but an election in which a miner is selected as a leader at random to avoid bias, such as the bias discussed above that is present in existing blockchain implementations. Any miner can become a leader, and the elections are driven by burning or destroying a cryptocurrency that is different than the cryptocurrency provided to a miner as a block reward and transaction fees when the miner is selected as a leader. The burned or destroyed cryptocurrency can be any cryptocurrency in which all miners and/or all nodes (e.g., peers that store an incomplete or complete copy of the blockchain, such as information for each of the current blocks in the blockchain) in the peer-to-peer network have access to the same information about the cryptocurrency. For example, such cryptocurrencies can include BITCOIN, ETHEREUM, LITECOIN, ZCASH, MONERO, NAMECOIN, PEERCOIN, etc.

Burning or destroying cryptocurrency, however, may be considered inefficient because a resource is being destroyed without any technical benefits to the security and/or reliability of the blockchain (other than the fact that a miner may be more likely to behave appropriately given that the miner is providing a resource to participate in a single-leader election). In some cases, nodes and/or other participants in the peer-to-peer network (e.g., user's wallets, user devices, etc.) may store an incomplete or complete copy of the blockchain, and thus may be aware of valid and/or invalid chains in the blockchain (e.g., a blockchain can fork at a particular block, resulting in one or more chains of blocks that are each descendant from the block; an invalid chain may be a chain that is not the longest chain (in number of blocks) descending from the block at the fork), miner actions that appear malicious, and/or the like. The nodes and/or other participants that store an incomplete or complete copy of the blockchain can submit and/or process transactions in association with the blockchain, which can reduce the negative effects of a miner that attempts to create a new block that is a descendant of an invalid chain and/or that attempts to create a new block via malicious actions (e.g., by submitting invalid block commitment transactions, by forking the blockchain to create a new block that incorrectly indicates that the miner holds a higher percentage of available holdings of a cryptocurrency, etc.) at least in part because the transactions may encode information about the chain(s) in the blockchain (e.g., the staleness or invalidity of a particular chain relative to an underlying burn or base chain).

To incentivize participants in the peer-to-peer network that have stored an incomplete or complete copy of the blockchain to monitor the blockchain and submit and/or process transactions for the purposes of improving the security and/or reliability of the peer-to-peer network, a blockchain that relies on a proof-of-transfer algorithm (also referred to herein as a consensus algorithm) can be implemented. Accordingly, the present disclosure is directed to an improved blockchain implementation that uses the proof-of-transfer algorithm to overcome the technical deficiencies of the proof of work and proof-of-stake implementations described above. For example, the proof-of-transfer algorithm may include elements of the single-leader election algorithm described above, but modified to change what happens to the cryptocurrency that would otherwise be burned or destroyed.

As described in greater detail below, the single-leader election algorithm involves a cryptographic sortition that uses a base chain (e.g., a blockchain corresponding to the cryptocurrency to be transferred, burned, or destroyed, which may also be referred to herein as a "burn chain") and a stacks chain or virtual chain that logically resides above the base chain. Each block in the stacks chain is anchored to a block in the base chain, and the miner that wins an election is allowed to form a new block in the stacks chain.

Participants in the peer-to-peer network can execute the proof-of-transfer algorithm in two phases to select leaders for future blocks in the stacks chain. In the first phase (also referred to herein as the "prepare phase"), participants in the peer-to-peer network (e.g., nodes or peers, miners, user wallets, user devices, etc.) determine an anchor block in the stacks chain and determine a set of reward addresses that are to receive base chain cryptocurrency (e.g., BITCOIN, ETHEREUM, LITECOIN, ZCASH, MONERO, NAMECOIN, PEERCOIN, any proof-of-work based cryptocurrency, etc.) from miners that submit block commit transactions during the second phase (also referred to herein as the "reward phase"). In particular, a participant can broadcast a participant transaction prior to the prepare phase that includes an indication of an amount of stacks chain cryptocurrency (e.g., cryptocurrency associated with the stacks chain and provided as a block reward and/or transaction fees to miners that create a block in the stacks chain) to be locked for a lockup period (e.g., where the stacks chain protocol may define the lockup period), an address to receive base chain cryptocurrency (e.g., where the address may be a base chain cryptocurrency address), and an indication of a base chain block height (e.g., a block height in the base chain at which the participant transaction may be considered valid, such as the block height of a block in the base chain in which the participant transaction is included, the block height of a current block in the base chain at the time that the participant transaction is broadcast, etc.). As described in greater detail below, participants in the peer-to-peer network can use the base chain block heights indicated in one or more participant transactions, in part, to select an anchor block. For example, the stacks chain may have various forks, resulting in one or more chains. An anchor block may be a block in the stacks chain that is a relatively distant ancestor of one or more blocks that are each currently at the tip of a chain (e.g., an anchor block can be a block that is 100 blocks, 150 blocks, 200 blocks, etc. behind one or more blocks that are each currently at the chain tip). Multiple participant transactions from different participants can be broadcast prior to the prepare phase.

The prepare phase may last for a certain number of base chain blocks (e.g., 200 base chain blocks, 220 base chain blocks, 240 base chain blocks, 260 base chain blocks, etc.). During the prepare phase and/or once the prepare phase is complete, peers or nodes in the peer-to-peer network can use the participant transactions broadcast prior to the prepare phase to determine the anchor block and the set of reward addresses that are to receive base chain cryptocurrency from miners that submit block commit transactions during the reward phase. For example, a peer can obtain data for some or all of the stacks blocks created during the prepare phase and determine, for each stacks block, the latest or highest ancestor block of the respective stacks block that was created before the prepare phase. Once the latest or highest ancestor block of each of the stacks blocks created during the prepare phase is determined, the peer can determine which ancestor block, if any, is determined to be the latest or highest ancestor block for a threshold percentage (e.g., 50%, 60%, 70%, 80%, etc.) of the stacks blocks created during the prepare phase. The peer then preliminary determines the anchor block to be the ancestor block that is the latest or highest ancestor block for the threshold percentage of the stacks blocks created during the prepare phase. The peer can then determine whether a second threshold of participant transactions are included in a stacks block that is an ancestor of this ancestor block (or a base chain block that is an anchor to a stacks block that is an ancestor of this ancestor block) and identify a base chain block height that is within a threshold block height of a current block height of the base chain. If so, then the peer determines that the ancestor block is the anchor block.

During the prepare phase and/or once the prepare phase is complete, peers or nodes in the peer-to-peer network can also use the participant transactions broadcast prior to the prepare phase to determine a set of reward addresses to receive base chain cryptocurrency committed by miners in block commit transactions during the reward phase. For example, a peer can determine, for each participant transaction, whether the amount of stacks chain cryptocurrency indicated to be locked up in the respective participant transaction is at least a threshold percentage of the total supply of the stacks chain cryptocurrency (e.g., where the total supply of the stacks chain cryptocurrency may be determined by a peer based on the stacks chain state included in the previously determined anchor block). If the amount is at least the threshold percentage, then the peer adds the address indicated in the respective participant transaction to the set of reward addresses to receive base chain cryptocurrency committed by miners in block commit transactions during the reward phase. Otherwise, if the amount is not at least the threshold percentage, then the peer does not add the address indicated in the respective participant transaction to the set.

During the reward phase, the base chain cryptocurrency committed by miners in block commit transactions may be transferred to a burn address (e.g., the base chain cryptocurrency may be burned or destroyed) if a miner submits a block commit transaction that indicates that the miner is attempting to create a block in the stacks chain that is not a descendant of the determined anchor block (e.g., a block commit transaction may include a reference to a stacks block upon which the newly created block would build off, such as a hash of a VRF proof present in the stacks block upon which the newly created block would build off). Conversely, during the reward phase, the base chain cryptocurrency committed by miners in block commit transactions may be transferred to at least some of the addresses in the determined set of reward addresses if a miner submits a block commit transaction that indicates that the miner is attempting to create a block in the stacks chain that is a descendant of the determined anchor block.

By submitting a participant transaction and including a base chain block height therein, the participant is essentially supporting a particular canonical view of the stacks chain and identifying the chain tip(s) from which the participant expects future blocks created by miners during the reward phase to descend. Because the base chain block height included in a participant transaction affects which block is chosen as an anchor block, the chosen anchor block affects whether base chain cryptocurrency is transferred to a burn address or to an address submitted by a participant, and the chosen anchor block is a relatively distant ancestor of one or more chain tip blocks, it may be very difficult for a malicious miner to attempt to reorganize the stacks chain and create a chain that descends from the chosen anchor block and that substantially favors the malicious miner (e.g., results in a disproportionate amount of stacks chain cryptocurrency being routed to the malicious miner as block rewards, participant rewards, and/or transaction fees) given the number of blocks that would have to be created by the malicious miner without interference from actors in the peer-to-peer network acting in good faith. In fact, having the determined anchor block be dependent on a large percentage of miner support (e.g., where miner support may be expressed by a large percentage of stacks blocks being created by miners during the prepare phase being descendants of the determined anchor block) means that a malicious miner may have to collude with a large percentage of the mining power in the peer-to-peer network to even attempt an anchor block attack and/or a reorganization of the stacks chain for the purposes of benefiting the malicious miner. Thus, participants submitting participant transactions that are used to select anchor blocks improves the security of the stacks chain and allows participants to rely on the mining process (and thereby the stacks chain itself) being fair, valid, and unbiased.

Once the anchor block and set of reward addresses are determined, the reward phase can begin. Like the prepare phase, the reward phase may last for a certain number of base chain blocks (e.g., 1000 base chain blocks, 2000 base chain blocks, 3000 base chain blocks, 4000 base chain blocks, 5000 base chain blocks, etc.). In the reward phase, one or more single-leader elections may be performed, where each election is used to select a leader of a new block in the stacks chain. The base chain encodes the election history.

Initially, a miner that wishes to participate in a future election can register a public key in a block in the base chain. A miner may register a public key by submitting a public key registration transaction. Once a miner registers a public key in one block in the base chain, the miner may start participating in an election associated with a child block in the base chain (e.g., the next block in the base chain, the block after next in the base chain, etc.).

After a miner has submitted a public key registration transaction, the miner can participate in an election in association with a current block in the base chain by submitting a block commit transaction. The block commit transaction includes a VRF proof (or a hash of the VRF proof) and an indication that a certain amount of the cryptocurrency associated with the base chain that is being committed. For example, the miner may generate a message that is a hash of a VRF proof present in a previous block in the stacks chain or may obtain the hash of the VRF proof if this hash (rather than the VRF proof itself) is already present in a header of the previous block in the stacks chain. The miner may then generate the VRF proof included in the block commit using the message and the miner's private key (e.g., by hashing the message and the miner's private key, by a combination of hashing the message and the miner's private key and performing algebraic operations on elliptic curve points, etc.).

Any number of miners can submit block commit transactions in association with a current block in the base chain. Before submitting a block commit transaction, as part of submitting a block commit transaction, or immediately after submitting a block commit transaction, a miner transfers the committed base chain cryptocurrency to either a burn address (e.g., if the miner is attempting to become the leader for a new block in the stacks chain that does not descend from the determined anchor block, which may be the case if the hash of the VRF proof included in the block commit transaction is derived from a previous block in the stacks chain that does not descend from the determined anchor block) or one or more addresses in the set of reward addresses (e.g., if the miner is attempting to become the leader for a new block in the stacks chain that does descend from the determined anchor block, which may be the case if the hash of the VRF proof included in the block commit transaction is derived from a previous block in the stacks chain that does descend from the determined anchor block). If the miner is attempting to become the leader of a new block in the stacks chain that does descend from the determined anchor block, the miner can identify the address(es) to which base chain cryptocurrency should be transferred using the VRF proof in a similar manner as used below to perform the sortition. By using the VRF proof, each miner that is attempting to become the leader for a new block in the stacks chain that does descend from the determined anchor block may identify the same address(es) to which base chain cryptocurrency should be transferred. After base chain cryptocurrency is transferred to the identified address(es) in the set of reward addresses, the identified address(es) may be removed from the set of reward addresses going forward for future stacks blocks created during the reward phase. In this way, each address included in the set of reward addresses may receive base chain cryptocurrency before the reward phase ends.

The probability that any one miner is selected as the leader to form the next block in the stacks chain may be based on how much cryptocurrency is committed by the respective miner. For example, if one miner committed 20% of all the cryptocurrency committed by all miners in the aggregate in association with a particular block in the base chain, then this miner may have a 20% chance of being selected as the leader.

Some or all of the peers and/or miners participating in the peer-to-peer network can each process a set of operations to perform the election or sortition for selecting the leader of a new block in the stacks chain. For example, once all block commits have been received for a particular block in the base chain, a peer and/or miner can assign a range of values between 0 and $2^{256}-1$ to each miner that submitted a block commit. The length of an assigned range may correspond to the amount of cryptocurrency committed by the respective miner. For example, a miner that committed 20% of all the cryptocurrency committed in association with the block commits may be assigned 20% of the range of values between 0 and $2^{256}-1$. The peer and/or miner can then obtain a proof of work nonce from the header of the particular block in the base chain, and identify a value between 0 and $2^{256}-1$ using the message and the proof of work nonce. As an illustrative example, the peer and/or miner can sum, hash, or otherwise combine the message and the proof of work nonce (which may be optionally scaled up from a value between 0 and $2^{32}-1$ to a value between 0 and $2^{256}-1$), and calculate the combination modulo $2^{256}-1$ to identify the value in the range. The miner assigned a range of values within which the identified value falls is then selected by the peer(s) and/or miner(s) as the leader of the next block in the stacks chain.

The operations described above for selecting the leader of the next block in the stacks chain can prevent or reduce the likelihood of "ballot stuffing" because the chances for being selected as the leader can only be improved by committing a resource (e.g., cryptocurrency)—simulating multiple miners in attempt to become the leader is therefore ineffective. Unlike existing blockchain implementations, however, the improved blockchain implementation disclosed herein that uses the disclosed single-leader election algorithm can reduce the likelihood of "ballot stuffing" without wasting excessive amounts of energy, without favoring miners that have cheap access to a source of energy, and without favoring miners that have computing power that far exceeds the computing power of other miners in the peer-to-peer network. Rather, miners in the improved blockchain implementation disclosed herein can conduct a single-leader election that is fair and unbiased, with the chances of being selected as a leader subject to a miner's willingness to part with a cryptocurrency associated with a base chain.

While the reward phase is ongoing, the prepare phase for the next rewards phase may begin. For example, the prepare phase for the next rewards phase may overlap the last N base chain blocks (e.g., last 200 base chain blocks, last 220 base chain blocks, last 240 base chain blocks, etc.) of the current reward phase. The operations described above may then be repeated for the prepare phase for the next rewards phase, for the next rewards phase, and so on.

The foregoing aspects and many of the attendant advantages of this disclosure will become more readily appreciated as the same become better understood by reference to the following detailed description, when taken in conjunction with the accompanying drawings.

Example Improved Blockchain Environment

FIG. 1 is a block diagram of an illustrative operating environment 100 in which an improved blockchain implements proof-of-transfer to increase blockchain security and reliability. The operating environment 100 includes a data plane and a control plane.

One or more virtual chain nodes 120, one or more miner devices 122, and/or one or more user devices 124 are present in the data plane. The virtual chain node(s) 120 may represent physical or virtual computing devices acting as peers or nodes (e.g., devices that store an incomplete or complete copy of the blockchain and that can verify some or all transactions that have occurred since the genesis of the blockchain) in a decentralized network, the miner device(s) 122 may represent physical or virtual computing devices acting as miners (e.g., devices that form new blocks in a blockchain, where some of the devices may also store an incomplete or complete copy of the blockchain and/or obtain information about the blockchain from other virtual chain nodes 120 and/or miner devices 122) in a decentralized network, and the user device(s) 124 may represent physical or virtual computing devices (e.g., devices operated by users having a wallet that stores cryptocurrency) with access to the decentralized network that can provide transactions (e.g., updates to application data, new application data, participant transactions, etc.) for processing and/or storage in the blockchain. Each of the virtual chain node(s) 120, the miner device(s) 122, and the user device(s) 124 may communicate with each other in a decentralized network (e.g., a peer-to-peer network).

In general, the virtual chain node(s) 120, the miner device(s) 122, and/or the user device(s) 124 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. As described in greater detail below, a virtual chain node 120 and/or a miner device 122 can launch and execute one or more virtual machine (VM) instances, where each VM instance acts as a node in a decentralized network that implements the virtual chain described herein and can be associated with a user or participant. Thus, the terms "node" and "VM instance" can be used interchangeably.

In particular, each VM instance running on each virtual chain node 120 and/or miner device 122 may store the same information, such as base chain block information (e.g., data identifying committed transactions, base chain block header data, etc.), virtual chain block information (e.g., data identifying committed transactions, virtual chain block header data, etc.), etc. Generally, a VM instance tracks a single chain (e.g., the base chain, the virtual chain, etc.). Thus, a single computing device (e.g., a virtual chain node 120 or a miner device 122) can run multiple VM instances, one for each chain in the control plane. As an illustrative example, a single computing device can run one VM instance to track the base chain (e.g., store base chain block information) and another VM instance to track the virtual chain (e.g., store virtual chain block information). The VM instances can communicate with each other to, for example, exchange information about the chain tracked by the respective VM instance (e.g., a VM instance tracking the base chain can share block header information with a VM instance tracking a virtual chain upon request by the VM instance tracking the virtual chain). A single computing device does not necessarily need to launch a different VM instance for each chain in the control plane, however. For example, a single computing device can launch VM instances to track some, but not all, of the chains in the control plane. In other embodiments, separate computing devices (e.g., different virtual chain nodes 120 or miner devices 122) can run separate VM instances, where each computing device runs a VM instance to track a different chain in the control plane. As an illustrative example, a first computing device can run a VM instance to track the base chain and a second computing device can run a VM instance to track the virtual chain. The computing devices can communicate with each other to, for example, exchange information about the chain tracked by the respective computing device (e.g., a computing device tracking the base chain can share block header information with a computing device tracking a virtual chain upon request by the computing device tracking the virtual chain).

The VM instances (or computing devices) corresponding to the same chain may store the same information because each VM instance (or computing device) may broadcast a message to one or more other VM instances (or one or more other computing devices) when the respective VM instance (or computing device) submits a transaction or receives a message indicating that a transaction has been submitted. For example, the VM instances (or computing devices) can communicate using a gossip protocol in which a VM instance (or computing device) forwards messages indicating that a transaction is submitted to its neighbor VM instances (or neighbor computing devices). Because each VM instance (or computing device) receives and stores the same transaction data, each VM instance (or computing device) has a copy of the same chain. The VM instances (or computing devices) can then independently perform the same operations to determine an anchor block, a set of reward addresses, the leaders of future blocks in the virtual chain, and where base chain cryptocurrency should be transferred, as described in greater detail below.

As an illustrative example, a first VM instance running on a first virtual chain node 120 may execute a series of operations to determine that a particular block in the virtual chain should be identified as the anchor block during a prepare phase. Similarly, a second VM instance running on a second virtual chain node 120 may execute the same operations to determine that the same block in the virtual chain should be identified as the anchor block during the prepare phase.

A virtual chain node 120 or miner device 122 can launch and execute a VM instance as a standalone application. Alternatively, a virtual chain node 120 or miner device 122 can run an application within which the VM instance is launched and executed. For example, the application can be a mobile application.

As described herein, VM instances or computing devices that track the base chain and/or the virtual chain may store various data of the virtual chain. For example, the virtual chain node 120 or miner device 122 can launch a VM instance that tracks the base chain and/or the virtual chain and that stores smart contract code (e.g., business logic) and proof of transfer code. The smart contract code may define functions that can be called by virtual chain node(s) 120, miner device(s) 122, and/or user device(s) 124 (e.g., the smart contract code may define transactions that can be submitted by any of the devices, including the information to include in a transaction (e.g., information to include in a participant transaction, a delegate initiation transaction, a delegate termination transaction, a public key registration transaction, a block commit transaction, etc.)), rules or instructions that define under what conditions a base chain cryptocurrency is transferred to a burn address or an address in a set of reward addresses, rules or instructions that define under what conditions a virtual chain block is considered an anchor block, rules or instructions that define under what conditions an address included in a participant transaction can be included in a set of reward addresses, rules or instructions that define a percentage of block rewards given to a miner that created a block in the virtual chain, rules or instructions that define a length (in base chain blocks) of a prepare phase, rules or instructions that define a length (in base chain blocks) of a reward phase, and/or the like. The proof of transfer code may include rules or instructions that define how a sortition is to occur to select a leader of the next block in the virtual chain. The VM instance can further store additional information, such as transactions that may be stored in a block in the virtual chain, the underlying blockchain to use as the base chain, the type of cryptocurrency that is committed during an election or sortition, and/or the like.

The control plane may include at least two blockchains. In general, a blockchain is a global append-only log. Writes to the global append-only log are called transactions, and transactions are organized into blocks. Thus, each block can include or package a single transaction or multiple transactions. Writing to the global append-only log (e.g., writing to a block) may require a payment in the form of a transaction fee. Nodes (e.g., virtual chain nodes 120 and/or miner devices 122) participating in the peer-to-peer network follow a leader election protocol (e.g., a single-leader election protocol) for deciding which miner gets to write the next block in the blockchain. The miner that gets to write the next block in the blockchain may be awarded a block reward (e.g., in the form of cryptocurrency) and can collect the transaction fees for the transactions that will be written to this next block.

The first blockchain in the control plane is a base chain, and the second blockchain in the control plane is a virtual chain (also referred to herein as a "stacks chain") that relies on the base chain. For example, the base chain may be an existing blockchain, such as a BITCOIN blockchain, an ETHEREUM blockchain, etc. The base chain may include one or more base chain blocks 130, where each base chain block 130 references a parent of the base chain block 130. Thus, the base chain blocks 130 may form a chain of blocks, with each base chain block 130 encoding one or more transactions corresponding to the base chain.

The virtual chain may be referred to as a "virtual chain" because the virtual chain may reside or lay on top of the base chain. The virtual chain may include one or more virtual chain blocks 132 that are each anchored to a base chain block 130. Like the base chain blocks 130, the virtual chain blocks 132 may reference a parent block and therefore form a chain of blocks, and the virtual chain blocks 132 may each encode one or more transactions corresponding to the virtual chain. However, the base chain may have a first cryptocurrency base (e.g., transactions are executed in the base chain using the first cryptocurrency), and the virtual chain may have a different, second cryptocurrency base (e.g., transactions are executed in the virtual chain using the second cryptocurrency). While the virtual chain blocks 132 and the base chain blocks 130 form separate blockchains, the formation of a virtual chain block 132 may rely on transactions encoded in the base chain blocks 130. For example, a VM instance can use one or more transactions encoded in the base chain blocks 130 to determine the leader of the next virtual chain block 132, as described in greater detail below.

In some embodiments, a virtual chain block 132 may include or otherwise encode a current state of the virtual chain, including a total amount of virtual chain cryptocurrency currently available in the peer-to-peer network.

The base chain blocks 130, the virtual chain blocks 132, and any other blocks in the control plane may each be data structures comprised of a block header and transaction data. The block header may include various data, such as a reference to the immediately preceding block in the blockchain (e.g., a reference to the parent of the block, where the reference may be a hash of the header of the immediately preceding block in the blockchain), a Merkle root (e.g., a hash of all the hashes of the transactions stored in the block), a VRF proof, and/or a timestamp.

FIG. 2A is a block diagram of an illustrative operating environment 200 in which an improved blockchain is implemented via one or more VM instances 220 and/or 230. The operating environment 200 includes various virtual chain nodes 120, some or all of which may communicate with each other via a network. The network may include any wired network, wireless network, or combination thereof. For example, the network may be a personal area network, local area network, wide area network, over-the-air broadcast network (e.g., for radio or television), cable network, satellite network, cellular telephone network, or combination thereof. As a further example, the network may be a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications (GSM) network, a Code Division Multiple Access (CDMA) network, a Long Term Evolution (LTE) network, or any other type of wireless network. The network can use protocols and components for communicating via the Internet or any of the other aforementioned types of networks. For example, the protocols used by the network may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As described above, each virtual chain node 120 can launch and execute one or more VM instances 220 and/or 230. The VM instance 220 may be a base chain VM instance (e.g., a VM instance that tracks the base chain) that includes various components to implement the improved blockchain described herein. For example, the base chain VM instance 220 may include a transaction processor 221, an anchor block identifier 222, an address validator 223, a sortition executor 224, and a block data store 225.

The VM instance 230 may be a virtual chain VM instance (e.g., a VM instance that tracks the virtual chain) that includes various components to implement the improved blockchain described herein. For example, the virtual chain VM instance 230 may include a transaction processor 231, an anchor block identifier 232, an address validator 233, and a block data store 234.

The transaction processor 221 can broadcast and/or receive various messages indicating that a transaction has been stored or executed. For example, the transaction processor 221 can broadcast that a virtual chain node 120 has submitted a participant transaction, that a miner device 122 has submitted a participant transaction, a public key registration transaction, and/or a block commit transaction, that a user device 124 has submitted a transaction for storage in a base chain block 130, that a user device 124 has submitted a participant transaction, a delegate initiation transaction, and/or a delegate termination transaction, and so on.

Before a reward phase begins, participants in the peer-to-peer network may attempt to reach a consensus on an anchor block and a set of reward addresses to provide the technical benefits described herein (e.g., improved security and reliability of the virtual chain). Reaching a consensus is a non-trivial exercise, however. For example, the virtual chain may have properties independent of the base chain, and may experience forks, missing block data, and/or malicious miner activity, some or all of which may make reaching a consensus difficult. As one example, a miner could attempt to fork the virtual chain with a block that claims to hold a large percentage (e.g., 100%) of all virtual chain cryptocurrency holdings, and proceed to issue block commit transactions during a reward phase that would eventually transfer all of block rewards, transaction fees, and/or base chain cryptocurrency to itself. In conjunction with participants submitting participant transactions prior to the prepare phase, the anchor block identifier 222 and/or the address validator 223 can initiate operations during the prepare phase, once the prepare phase has completed, and/or before the reward phase has started to identify invalid block commit transactions, invalid virtual chain blocks, and/or the like and allow the participants to reach a consensus on an anchor block and a set of reward addresses despite the issues described above that may arise in the virtual chain.

The anchor block identifier 222 can identify an anchor block during and/or at the end of a prepare phase. For example, the anchor block identifier 222 can track the blocks created in the base chain. As described above, a prepare phase may begin near the end of the last reward phase. Thus, the anchor block identifier can track the blocks created in the base chain and identify when a block in the base chain has been created that represents the start of the prepare phase. Similarly, the anchor block identifier can track the blocks created in the base chain and identify when a block in the base chain has been created that represents the end of the prepare phase. Once the anchor block identifier 222 determines that the prepare phase is occurring and/or the end of the prepare phase has been reached, the anchor block identifier 222 can obtain base chain block data from the block data store 225, participant transaction data from the transaction processor 221 (e.g., data corresponding to participant transactions broadcast on the base chain and broadcast and/or received by the transaction processor 221 prior to and/or during the prepare phase), and/or participant transaction data from the transaction processor 231 (e.g., data corresponding to participant transactions broadcast on the virtual chain and broadcast and/or received by the transaction processor 221 prior to the prepare phase (e.g., in conjunction with a block residing before the anchor block identified by the anchor block identifier 222 for the corresponding reward phase)).

The anchor block identifier 222 can then determine, for each virtual chain block created during the prepare phase, the latest or highest ancestor block of the respective virtual chain block that was created before the prepare phase. Once the latest or highest ancestor block of each of the virtual chain blocks created during the prepare phase is determined, the anchor block identifier 222 can determine which ancestor block, if any, is determined to be the latest or highest ancestor block for a threshold percentage (e.g., 50%, 60%, 70%, 80%, etc.) of the virtual chain blocks created during the prepare phase. The anchor block identifier 222 then preliminary determines that the ancestor block that is the latest or highest ancestor block for the threshold percentage of the virtual chain blocks created during the prepare phase is a candidate anchor block. The anchor block identifier 222 may set a relatively high threshold percentage to protect the virtual chain from damage caused by natural forks, missing block data, and/or potentially malicious participants. For example, if the data associated with a potential anchor block is unavailable to many participants in the peer-to-peer network (either due to malice or by accident), then these participants may not be able to determine whether a miner is submitting valid block commit transactions. A relatively high threshold percentage may ensure that a large percentage of mining power in the peer-to-peer network has at least confirmed receipt of the data associated with the potential anchor block.

The anchor block identifier 222 can then use the participant transaction data to determine whether a second threshold percentage (which can be the same percentage or different percentage used to determine the candidate anchor block) of participant transactions are included in a virtual chain block that is an ancestor of the candidate ancestor block (or a base chain block that is an anchor to a virtual chain block that is an ancestor of the candidate ancestor block) and identify a base chain block height that is within a threshold block height of a current block height of the base chain. If a particular stacks chain block (1) is identified as the latest or highest ancestor block for a threshold percentage of the stacks blocks created during the prepare phase and (2) is a descendant of one or more virtual chain blocks that (a) collectively include and/or (b) are anchored to base chain block(s) that collectively include) a second threshold percentage of participant transactions that identify a base chain block height that is within a threshold block height of a current block height of the base chain, then the anchor block identifier 222 determines that the candidate anchor block is in fact the anchor block that will be used to determine to where base chain cryptocurrency will be transferred during the reward phase.

In further embodiments, if a malicious miner device 122 is able to get a hidden or invalid block accepted as an anchor block (e.g., the anchor block identifier 222 identifies a hidden or invalid block as the anchor block), this may negatively affect the security and/or reliability of the virtual chain. As a result, virtual chain nodes 120, miner devices 122, and/or user devices 124 may treat missing anchor block data as if no anchor block was chosen for a reward phase, which means that base chain cryptocurrency committed in block commit transactions during the reward phase may be transferred to burn addresses only (instead of to reward addresses). If anchor block data that was previously missing (either accidentally or maliciously) is not available to the participants in the peer-to-peer network, then the participants may reprocess some or all of the single-leader sortitions during the reward phase for which the anchor block was identified as the anchor block (e.g., because there may now be block commit transactions that were previously invalid that are now valid).

The address validator 223 can identify a set of reward addresses to which base chain cryptocurrency should be transferred from miners that submit block commitment transactions during the reward phase. For example, the address validator 223 can obtain participant transaction data from the transaction processor 221 and/or the transaction processor 231 in a manner as described above with respect to the anchor block identifier 222 and determine the set of reward addresses when the prepare phase has ended. Similar to the anchor block identifier 222, the address validator 223 can track the base chain blocks to identify when the prepare phase has ended. The address validator 223 can then determine the total amount of virtual chain cryptocurrency that is locked up by the participant transactions. If the address validator 223 determines that the total amount of virtual chain cryptocurrency locked up by the participant transactions is 100% of all virtual chain cryptocurrency available in the peer-to-peer network (as indicated by the virtual chain state included in the determined anchor block), then the address validator 223 can add an address included in a participant transaction to a set of reward addresses if the address validator 223 determines that the participant transaction indicates that the amount of virtual chain cryptocurrency being locked up is at least 1/(N*M) of the total amount of virtual chain cryptocurrency available in the peer-to-peer network, where N represents the number of addresses that are to receive base chain cryptocurrency after each election (e.g., 2, 3, 4, 5, 6, etc.) and M represents the number of base chain blocks that are to be created during the complete reward phase (e.g., 1000, 2000, 3000, etc.). If the address validator 223 determines that the participant transaction indicates that the amount of virtual chain cryptocurrency being locked up is a multiple of 1/(N*M) of the total amount of virtual chain cryptocurrency available in the peer-to-peer network, then the address validator 223 adds the address included in the participant transaction to the set of reward addresses multiple times in proportion (unless the participant transaction includes multiple addresses, in which case each address may be included in the set of reward addresses one or more times to match the proportion). As an illustrative example, if the address validator 223 determines that the participant transaction indicates that the amount of virtual chain cryptocurrency being locked up is 3/(N*M) of the total amount of virtual chain cryptocurrency available in the peer-to-peer network, then the address validator 223 adds the address included in the participant transaction to the set of reward addresses three times (unless the participant transaction includes two addresses, for example, in which case one of the addresses may be included in the set of reward addresses once and the other address may be included in the set of reward addresses twice). If the address validator 223 determines that the participant transaction indicates that the amount of virtual chain cryptocurrency being locked up is less than 1/(N*M) of the total amount of virtual chain cryptocurrency available in the peer-to-peer network, then the address validator 223 does not add the address included in the participant transaction to the set of reward addresses.

However, if the address validator 223 determines that the total amount of virtual chain cryptocurrency locked up by the participant transactions is between 25% and 100% of all virtual chain cryptocurrency available in the peer-to-peer network, then the address validator 223 can add an address included in a participant transaction to a set of reward addresses if the address validator 223 determines that the participant transaction indicates that the amount of virtual chain cryptocurrency being locked up is at least 1/(N*M) of the total amount of virtual chain cryptocurrency locked up by the participant transactions. If the address validator 223 determines that the participant transaction indicates that the amount of virtual chain cryptocurrency being locked up is a multiple of 1/(N*M) of the total amount of virtual chain cryptocurrency locked up by the participant transactions, then the address validator 223 adds the address included in the participant transaction to the set of reward addresses multiple times in proportion (unless the participant transaction includes multiple addresses, in which case each address may be included in the set of reward addresses one or more times to match the proportion). As an illustrative example, if the address validator 223 determines that the participant transaction indicates that the amount of virtual chain cryptocurrency being locked up is 3/(N*M) of the total amount of virtual chain cryptocurrency locked up by the participant transactions, then the address validator 223 adds the address included in the participant transaction to the set of reward addresses three times (unless the participant transaction includes three addresses, for example, in which case each address is included in the set of reward addresses once). If the address validator 223 determines that the participant transaction indicates that the amount of virtual chain cryptocurrency being locked up is less than 1/(N*M) of the total amount of virtual chain cryptocurrency locked up by the participant transactions, then the address validator 223 does not add the address included in the participant transaction to the set of reward addresses.

If the address validator 223 determines that the total amount of virtual chain cryptocurrency locked up by the participant transactions is less than 25% of all virtual chain cryptocurrency available in the peer-to-peer network, then the address validator 223 can add an address included in a participant transaction to a set of reward addresses if the address validator 223 determines that the participant transaction indicates that the amount of virtual chain cryptocurrency being locked up is at least 1/(X*N*M) of the total amount of virtual chain cryptocurrency available in the peer-to-peer network, where X represents an integer value (e.g., 1, 2, 3, 4, 5, 6, etc.). If the address validator 223 determines that the participant transaction indicates that the amount of virtual chain cryptocurrency being locked up is a multiple of 1/(X*N*M) of the total amount of virtual chain cryptocurrency available in the peer-to-peer network, then the address validator 223 adds the address included in the participant transaction to the set of reward addresses multiple times in proportion (unless the participant transaction includes multiple addresses, in which case each address may be included in the set of reward addresses one or more times to match the proportion). As an illustrative example, if the address validator 223 determines that the participant transaction indicates that the amount of virtual chain cryptocurrency being locked up is 3/(X*N*M) of the total amount of virtual chain cryptocurrency available in the peer-to-peer network, then the address validator 223 adds the address included in the participant transaction to the set of reward addresses three times (unless the participant transaction includes four addresses, for example, in which case three of the addresses are included in the set of reward addresses once and the fourth address is not included in the set of reward addresses). If the address validator 223 determines that the participant transaction indicates that the amount of virtual chain cryptocurrency being locked up is less than 1/(X*N*M) of the total amount of virtual chain cryptocurrency available in the peer-to-peer network, then the address validator 223 does not add the address included in the participant transaction to the set of reward addresses.

The address validator 223 can repeat these operations for some or all of the participant transactions submitted before the prepare phase ends (e.g., if the participant transactions are broadcast on the base chain) and/or some or all of the participant transactions submitted prior to the prepare phase and before the anchor block of the reward phase determined by the anchor block identifier 222 (e.g., if the participant transactions are broadcast on the virtual chain). Once completed, the address validator 223 can determine whether the number of addresses included in the set of reward addresses is equal to the number of slots available in the reward phase, where the number of slots is equal to N*M. If the address validator 223 determines that the number of addresses in the set of reward addresses is less than the number of slots available in the reward phase, then the address validator 223 can add a burn address to the set of reward addresses one or more times until the number of addresses in the set of reward addresses matches the number of slots available in the reward phase (e.g., if the set of reward addresses includes 1500 addresses and the number of slots available in the reward phase is 2000, then the address validator 223 can add the burn address to the set of reward addresses 500 times).

The sortition executor 224 can perform one or more single-leader elections during the reward phase (e.g., after an anchor block and a set of reward addresses is determined, where the number of elections performed may be at most the number of base chain blocks that define the length of the reward phase). For example, in one election, a miner device 122 can qualify to become a leader of the next block in the virtual chain 132 if the miner device 122 submits a public key registration transaction in a base chain block 130 that precedes a base chain block 130 at which the election occurs. The public key registration transaction may include a public key of the miner device 122, which can later be used to validate a future virtual chain 132 block if the miner device 122 is chosen as a leader of the block. The transaction processor 221 may have received messages indicating that one or more miner devices 122 have submitted public key registration transactions and have submitted block commit transactions in association with a particular base chain block 130, with the messages including the corresponding transaction data. The sortition executor 224 can use the transaction data to determine a probability associated with each miner device 122 that submitted a block commit transaction in association with the particular base chain block 130. In particular, the block commit transaction data may indicate an amount of a cryptocurrency committed by each miner device 122 that submitted a block commit transaction in association with the particular base chain block 130. Optionally, the sortition executor 224 can sum the total amount of cryptocurrency committed by each miner device 122 that submitted a block commit transaction in association with the particular base chain block 130. The sortition executor 224 can then compare the sum to a burn quota. If the sum is equal to or exceeds the burn quota, the sortition executor 224 continues with the sortition. However, if the sum is less than the burn quota, the sortition executor 224 stops and no sortition occurs in association with the particular base chain block 130. Rather, a sortition may occur in association with a subsequent base chain block 130, as described in greater detail below. Having the occurrence of a sortition be dependent on whether the sum is equal to or exceeds the burn quota is optional, as a sortition can occur regardless of whether the sum would be equal to or exceed the burn quota.

If the sortition executor 224 sums the total amount of cryptocurrency committed, compares the sum to the burn quota, and determines that the sum is equal to or exceeds the burn quota or once the sum is complete (e.g., if the burn quota is not used to control sortition occurrence), the sortition executor 224 then determines the percentage of the sum that was committed by each of the miner device(s) 122 that submitted a block commit transaction. The sortition executor 224 can assign each miner device 122 the determined percentage, which represents the likelihood that the respective miner device 122 will be selected as the leader of the next virtual chain block 132.

The sortition executor 224 can generate a value that is used to select the leader of the next virtual chain block 132. The value may fall within a certain range, such as 0 to $2^{256}-1$ if 256 bit encryption is being used. Because the value can fall within a certain range, the sortition executor 224 can assign different portions or intervals of the range to the miner device(s) 122 that submitted the block commit transaction in association with the particular base chain block 130. The percentage of the range assigned to a miner device 122 may be equivalent to a percentage of the sum that was committed by the miner device 122. The range assigned to the miner device 122 can be contiguous or non-contiguous. For example, if a miner device 122 committed 20% of the sum, the sortition executor 224 may assign the miner device 122 20% of the range. The sortition executor 224 can assign the miner device 122 the first 20% of the range, the last 20% of the range, a middle 20% of the range, 10% of the first half of the range and 10% of the second half of the range, and/or the like. The portion of a range to assign to a miner device 122 may be defined by a rule stored in the block data store 225.

To generate the value, the sortition executor 224 can first sum a message (e.g., a hash of a VRF proof present in the header of a previous virtual chain block 132) and a proof of work nonce obtained from the header of the base chain block 130 within which the block commit transactions that led to this sortition are stored. Alternatively, the sortition executor 224 can hash or otherwise combine the message and the proof of work nonce obtained from the header of the base chain block 130 within which the block commit transactions that led to this sortition are stored. Once combined, the sortition executor 224 can compute the combination modulo $2^{256}-1$ to generate the value. The modulo operation may ensure that the generated value does not fall outside the 0 to $2^{256}-1$ range and can obscure the resulting value that will be used to select the leader. The sortition executor 224 then selects the miner device 122 assigned to the portion of the range within which the generated value falls as the leader of the next virtual chain block 132, where the next virtual chain block 132 will be anchored to the base chain block 130 for which the sortition was conducted. The sortition executor 224 or another component (e.g., the transaction processor 221) can provide a block reward to the selected miner device 122 (e.g., by storing a transaction indicating that the block reward has been sent to the selected miner device 122).

Additional details of the operations performed by a sortition executor 224 to perform a single-leader election are described in U.S. patent application Ser. No. 16/424,158, entitled "CRYPTOCURRENCY MINING USING A SINGLE-LEADER ELECTION ALGORITHM" and filed on May 28, 2019, which is hereby incorporated by reference herein in its entirety.

Before a block commit transaction is submitted, as part of the submission of a block commit transaction, or immediately after a block commit transaction is submitted, the address validator 223 can determine whether the base chain cryptocurrency committed in the block commit transaction should be transferred to a burn address or to one or more addresses in the set of reward addresses and can initiate the transfer. For example, the address validator 223 can obtain an indication of the anchor block selected during the prepare phase from the anchor block identifier 222 and an indication of the previous virtual chain block 132 referenced in the block commit transaction from the transaction processor 221 and/or 231 (e.g., an indication of the previous virtual chain block 132 upon which the miner device 122 is attempting to build off, such as a hash of a VRF proof of a previous virtual chain block 132). If the address validator 223 determines that the miner device 122 is attempting to become the leader of a new virtual chain block 132 that is a descendant of the anchor block selected during the prepare phase, then the address validator 223 determines that the miner devices 122 that submitted the block commit transaction in association with the base chain block 130 to which the new virtual chain block 132 would be anchored should transfer the base chain cryptocurrency committed in the block commit transaction to at least one address in the set of reward addresses. Otherwise, if the address validator 223 determines that the miner device 122 is attempting to become the leader of a new virtual chain block 132 that is not a descendant of the anchor block selected during the prepare phase, then the address validator 223 determines that the miner device 122 that submitted block commit transaction in association with the base chain block 130 to which the new virtual chain block 132 would be anchored should transfer the base chain cryptocurrency committed in the block commit transaction to a burn address (and thus the base chain cryptocurrency will be burned or destroyed once transferred to the burn address). The address validator 223 can then cause the transaction processor 221 to broadcast the determination of where the base chain cryptocurrency should be transferred and/or cause the transaction processor 221 to perform the transfer according to the determination (e.g., if the address validator 223 is a component of a miner device 122 that submitted the block commit transaction).

To determine to which address(es) in the set of reward addresses the base chain cryptocurrency should be transferred, the address validator 223 can perform an operation similar to the single-leader election described above. For example, the address validator 223 can determine the total number of addresses in the set of reward addresses, and assign each address in the set of reward addresses a percentage equal to N/(the total number of addresses in the set of reward addresses). This percentage may represent the likelihood that a respective address in the set of addresses will be selected as an address to which base chain cryptocurrency will be transferred following a single-leader election.

The address validator 223 can generate a value that is used to select the address(es) in the set of reward addresses to which base chain cryptocurrency will be transferred. The value may fall within a certain range, such as 0 to $2^{256}-1$ if 256 bit encryption is being used. Because the value can fall within a certain range, the address validator 223 can assign different portions or intervals of the range to each address in the set of reward addresses. The percentage of the range assigned to an address in the reward address may be equivalent to the percentage assigned to the respective address. The range assigned to an address can be contiguous or non-contiguous. In addition, a particular range can be assigned to at most N addresses. For example, if a first address in the set of reward addresses is assigned 10% and a second address in the set of reward addresses is assigned 10%, the address validator 223 may assign the first address 10% of the range and the second address 10% of the range. The address validator 223 can assign the first address the first 10% of the range, the last 10% of the range, a middle 10% of the range, 5% of the first half of the range and 5% of the second half of the range, and/or the like, and can assign the second address any 10% of the range, including any portion that may be assigned to the first address and/or another address (assuming that the number of addresses assigned to a particular portion is no greater than N). The portion of a range to assign to an address may be defined by a rule stored in the block data store 225.

To generate the value, the address validator 223 can first sum a message (e.g., a hash of a VRF proof present in the header of a previous virtual chain block 132) and a proof of work nonce obtained from the header of the base chain block 130 within which the block commit transaction is or will be stored. Alternatively, the address validator 223 can hash or otherwise combine the message and the proof of work nonce obtained from the header of the base chain block 130 within which the block commit transaction is or will be stored. Once combined, the address validator 223 can compute the combination modulo $2^{256}-1$ to generate the value. The modulo operation may ensure that the generated value does not fall outside the 0 to $2^{256}-1$ range and can obscure the resulting value that will be used to select the address(es). The address validator 223 then selects the address(es) assigned to the portion of the range within which the generated value falls as the reward address(es) to which the base chain cryptocurrency committed in the block commit transaction should be transferred.

Once the address validator 223 identifies the address(es) to which the base chain cryptocurrency committed in the block commit transaction should be transferred, the address validator 223 removes these address(es) from the set of reward addresses. Thus, the next time a sortition is performed during the same reward phase, the address(es) selected by the address validator 223 may be different than the previously chosen address(es) (unless a particular address is included in the set of reward addresses multiple times). In this way, each of the addresses included in the set of reward addresses may eventually receive base chain cryptocurrency during the reward phase to reward the corresponding participant for helping improve the security and reliability of the virtual chain.

As described herein, the sortition executor 224 can perform multiple single-leader elections during a single reward phase and the address validator 223 can identify the address(es) to which base chain cryptocurrency should be transferred prior to each election (e.g., each time a block commit transaction is submitted prior to an election). Once the reward phase ends, participants in the peer-to-peer network may have selected a new anchor block and/or a new set of reward addresses, and the operations described herein as being performed by the sortition executor 224 and the address validator 223 can be repeated for the following reward phase, using the new anchor block and/or the new set of reward addresses.

The block data store 225 can store base chain block 130 data. For example, the block data store 225 can store a first table that includes public keys announced by various miner devices 122 via public key registration transactions and the base chain block 130 at which the public keys were announced (e.g., at which the public key registration transaction is stored), a second table that includes participant transaction data (e.g., an indication of an amount of virtual chain cryptocurrency being locked up, a duration of time for which the virtual chain cryptocurrency is being locked up, one or more addresses to receive base chain cryptocurrency, and/or an indication of a base chain block 130 height) corresponding to participant transactions broadcast in a base chain block 130, a third table that stores delegate information (e.g., an indication of a wallet address, an indication of a delegate address, a base chain block 130 height at which the delegate relationship terminates, an amount of virtual chain cryptocurrency from the wallet address that the delegate address will be able to lock up in participant transactions, a reward address that must be included in a participant transaction originating from the delegate address, an indication of a delegate address for which a delegate relationship is terminated, and/or the like) based on delegate initiation transactions and/or delegate termination transactions broadcast in a base chain block 130, and so on. The transaction processor 221 can update the first table each time a new public key registration transaction is received via the network from one or more other virtual chain nodes 120 and/or miner devices 122, can update the second table each time a participant transaction is received via the network from one or more other virtual chain nodes 120, miner devices 122, and/or user devices 124, and/or can update the third table each time a delegate initiation transaction or a delegate termination transaction is received via the network from one or more other virtual chain nodes 120, miner devices 122, and/or user devices 124.

The block data store 225 can further store a fourth table corresponding to the block commit transactions submitted by various miner devices 122. Each row in the fourth table can correspond to a block commit transaction, with each row including a VRF proof (or a hash of a VRF proof) generated by the miner device 122 that submitted the block commit transaction, an amount of cryptocurrency committed via the block commit transaction, and the base chain block 130 at which the block commit transaction is stored. The transaction processor 221 can update the fourth table each time a new block commit transaction is received via the network from one or more other virtual chain nodes 120 and/or miner devices 122.

While the block data store 225 is depicted as being internal to the base chain VM instance 220, this is not meant to be limiting. For example, the block data store 225 may reside internal to the virtual chain node 120, but external to the base chain VM instance 220. In this example, the VM instances 220 and/or 230 may share access to the block data store 225.

The transaction processor 231 can perform functions similar to the transaction processor 221, but with respect to the virtual chain. For example, the transaction processor 231 can broadcast and/or receive various messages indicating that a transaction has been stored or executed. For example, the transaction processor 231 can broadcast that a user device 124 has submitted a transaction for storage in a virtual chain block 132, that a virtual chain node 120, a miner device 122, and/or a user device 124 has submitted a participant transaction for storage in a virtual chain block 132, that a miner device 122 has submitted a public key registration transaction and/or a block commit transaction, and so on.

Similarly, the anchor block identifier 232 can perform functions similar to the anchor block identifier 222, and the address validator 233 can perform functions similar to the address validator 223. In addition, the block data store 234 can store data similar to the data stored in the block data store 225, but for virtual chain blocks 132 (e.g., the block data store 234 can store virtual chain block 132 data).

Any of the transaction processor 221, the transaction processor 231, the anchor block identifier 222, the anchor block identifier 232, the address validator 223, the address validator 233, the sortition executor 224, the block data store 225, and/or the block data store 234 can communicate with each other such that the appropriate component has access to the data necessary to perform some or all of the operations described herein.

In some cases, a miner device 122 or several miner devices 122 that submit participant transactions may gain an advantage over other miner devices 122 that do not submit participant transactions, which could incentivize the miner device(s) 122 that do submit participant transactions to obtain virtual chain cryptocurrency and crowd out other miner devices 122, thereby leading to miner consolidation. In some embodiments, to reduce the likelihood of miner consolidation occurring, the proof-of-transfer algorithm described herein (e.g., having a prepare phase and a reward phase) could proceed for a threshold period of time (e.g., 2 years, 3 years, 4 years, etc.) and/or a threshold number of base chain blocks (e.g., 100,000, 150,000, 200,000, etc.). After the threshold period of time and/or threshold number of base chain blocks passes, the participants in the peer-to-peer network can identify a sunset block, which may be a second threshold period of time (e.g., 8 years, 10 years, 12 years, etc.) and/or a second threshold number of base chain blocks (e.g., 400,000, 500,000, 600,000, etc.) after the threshold period of time and/or threshold number of base chain blocks passes. For any virtual chain blocks that are descendants of the sunset block, block commit transactions that include base chain cryptocurrency committed for vying to become a leader of the respective virtual chain blocks may be transferred to a burn address (as determined by the address validator 223, 233, 326, 333). For the virtual chain blocks that are ancestors of the sunset block and that are created after the threshold period of time and/or threshold number of base chain blocks passes, a block commit transaction that includes base chain cryptocurrency committed by a miner device 122 for vying to become a leader of one of the respective virtual chain blocks may be transferred by the miner device 122 at a reward address/burn address ratio that linearly decreases over time during each reward phase (as determined by the address validator 223, 233, 326, 333). For example, the reward address/burn address ratio may decrease by 0.25% after each reward phase. A miner device 122 may then transfer a portion of the committed base chain cryptocurrency to a reward address and a portion of the committed base chain cryptocurrency to a burn address according to the ratio set for the given reward phase. As an illustrative example, if a miner device 122 commits 10 base chain cryptocurrency in a block commit transaction and the ratio during the corresponding reward phase is 0.6, then the miner device 122 may transfer 6 base chain cryptocurrency to one or more reward addresses and 4 base chain cryptocurrency to a burn address. Optionally, participants in the peer-to-peer network, such as those holding virtual chain cryptocurrency, could vote to disable proof-of-transfer during any upcoming reward phase, where the vote may require a certain percentage of participants voting yes and/or a certain percentage of total virtual chain cryptocurrency holdings held by participants voting yes to pass.

Figure 2B:
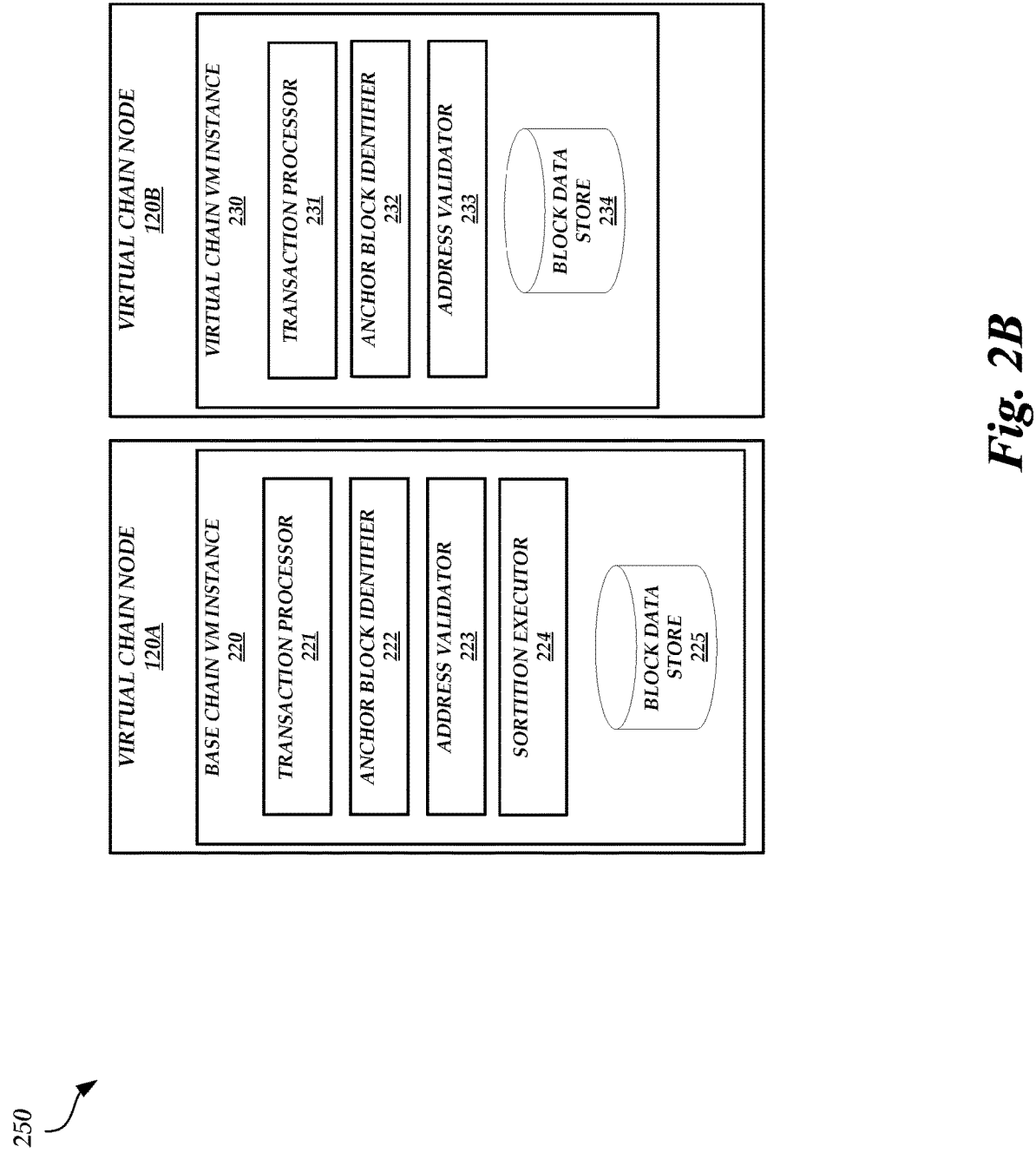
FIG. 2B is another block diagram of an illustrative operating environment in which an improved blockchain is implemented via one or more VM instances.

FIG. 2B is another block diagram of an illustrative operating environment 250 in which an improved blockchain is implemented via one or more VM instances 220 and/or 230. The operating environment 250 is similar to the operating environment 200, except that each VM instance 220 and 230 is initialized by a different virtual chain node 120A-120B. While the VM instances 220 and 230 may be running in different virtual chain nodes 120A-120B, the VM instances 220 and 230 may nonetheless be configured to communicate with one another.

Figure 3A:
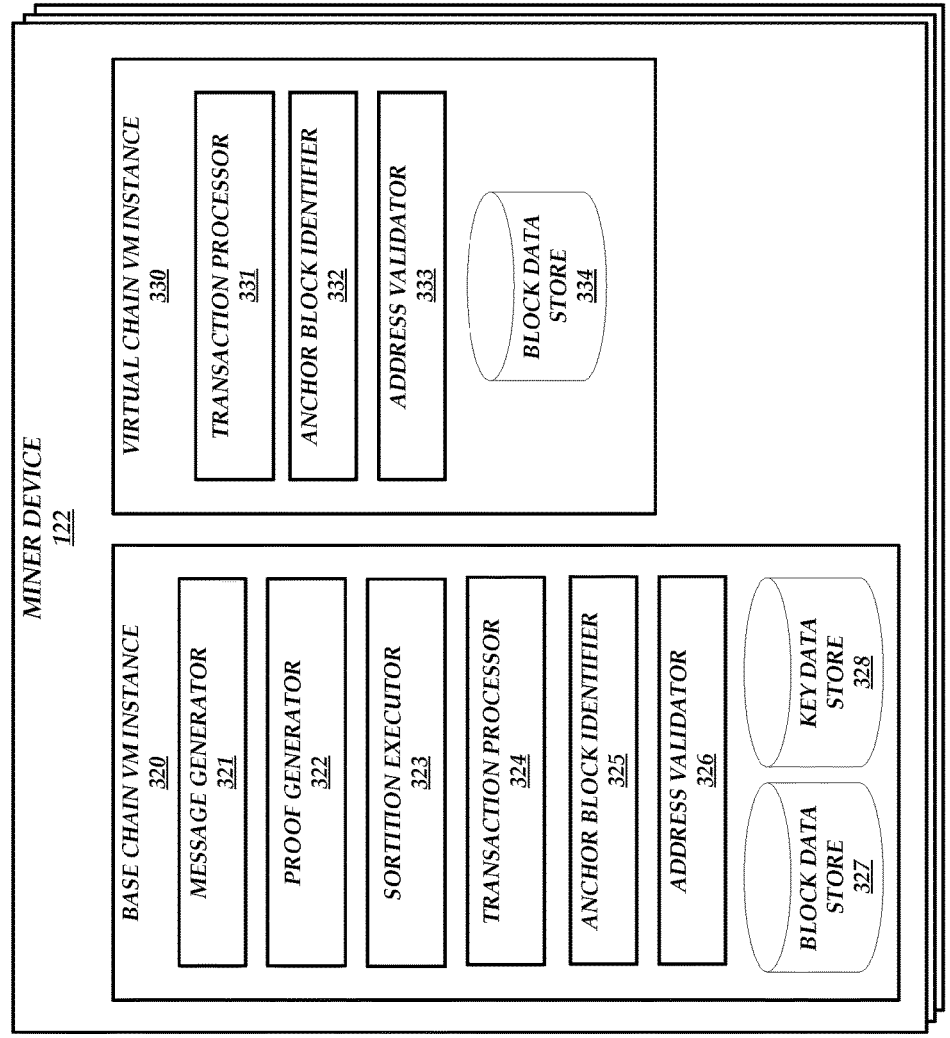
FIG. 3A is a block diagram of an illustrative operating environment in which an improved blockchain is implemented via one or more VM instances.

FIG. 3A is a block diagram of an illustrative operating environment 300 in which an improved blockchain is implemented via one or more VM instances 320 and/or 330. The operating environment 300 includes various miner devices 122, some or all of which may communicate with each other via the network.

As described above, each miner device 122 can launch and execute one or more VM instances 320 and/or 330. The VM instance 320 may be a base chain VM instance (e.g., a VM instance that mines blocks in the base chain, that participates in base chain sortitions to be able to mine virtual chain blocks 132, and/or that tracks the base chain) that includes various components to implement the improved blockchain described herein. For example, the base chain VM instance 320 may include a message generator 321, a proof generator 322, a sortition executor 323, a transaction processor 324, an anchor block identifier 325, an address validator 326, a block data store 327, and a key data store 328.

The VM instance 330 may be a virtual chain VM instance (e.g., a VM instance that mines blocks in the virtual chain and/or that tracks the virtual chain) that includes various components to implement the improved blockchain described herein. For example, the virtual chain VM instance 330 may include a transaction processor 331, an anchor block identifier 332, an address validator 333, and a block data store 334.

The base chain VM instance 320 may be similar to the base chain VM instance 220, except the base chain VM instance 320 can implement miner functionality as well. For example, the message generator 321 may generate a message that is eventually used to derive a VRF proof for the base chain VM instance 320. For example, the message generator 321 may generate the message by hashing a VRF proof present in a previous block in the virtual chain (e.g., a block that may become a parent to a new block to be formed in the virtual chain). In particular, the VRF proof of the previous block in the virtual chain may be present in the header of the previous block. The message generator 321 may obtain the VRF proof of the previous block by retrieving the data structure of the previous block from the block data store 327 and obtaining the VRF proof from the header portion of the data structure.

The proof generator 322 can generate a VRF proof for the base chain VM instance 320. For example, the proof generator 322 can obtain a private key of the base chain VM instance 320 from the key data store 328, and can use the message and the obtained private key to generate the VRF proof. Because the VRF proof is based, at least in part, on the private key, the VRF proof of each base chain VM instance 320 should be different. In addition, because the VRF proof is based, at least in part, on the message (and therefore the VRF proof of a previous block), each separate VRF proof generated by the proof generator 322 should be different. In general, the proof generator 322 may generate a new VRF proof each time the base chain VM instance 320 is attempting to submit a block commit transaction in association with a different block in the base chain.

The sortition executor 323 can perform single-leader elections to select leaders of new blocks in the virtual chain in a manner as described herein. For example, the sortition executor 323 can perform the operations described herein as being performed by the sortition executors 222 and 233 to perform the single-leader elections.

The transaction processor 324 can perform similar operations as the transaction processor 221 of FIGS. 2A-2B. In addition, the transaction processor 324 can submit participant transactions, public key registration transactions, block commit transactions, and/or any other transactions on behalf of the base chain VM instance 320. The transaction processor 324 can generate the transactions (e.g., by obtaining data from other components), specifying an amount of virtual chain cryptocurrency being locked up (e.g., for participant transactions), a supported anchor block (e.g., for participant transactions), an address to receive base chain cryptocurrency (e.g., for participant transactions), a public key of the base chain VM instance 320 (e.g., for public key registration transactions), an amount of base chain cryptocurrency that is committed (e.g., for block commit transactions), a base chain block 130 associated with the transaction (e.g., for a public key registration transaction, a block commit transaction, etc.), and/or the like.

The transaction processor 324 can also process block rewards received as a result of the base chain VM instance 320 being selected to form a base chain block 130. The transaction processor 324 may also process transaction fees received as a result of the base chain VM instance 320 being selected to form a base chain block 130, and transfer base chain cryptocurrency to the address(es) indicated by the address validator 326 if a block commit transaction is submitted.

The anchor block identifier 325 can perform the operations described herein as being performed by the anchor block identifiers 222 and 232. The address validator 326 can perform the operations described herein as being performed by the address validators 223 and 233.

The block data store 327 can store base chain block 130 data, similar to the block data store 225 of FIGS. 2A-2B. While the block data store 327 is depicted as being internal to the base chain VM instance 320, this is not meant to be limiting. For example, the block data store 327 may reside internal to the miner device 122, but external to the base chain VM instance 320. In this example, the VM instances 320 and/or 330 may share access to the block data store 327.

The key data store 328 can store public and private keys of the base chain VM instance 320. While the key data store 328 is depicted as being internal to the base chain VM instance 320, this is not meant to be limiting. For example, the key data store 328 may reside internal to the miner device 122, but external to the base chain VM instance 320. In this example, the VM instances 320 and/or 330 may share access to the key data store 328, and the key data store 328 may store public and private keys for each of the VM instances 320 and/or 330.

While the base chain VM instance 320 is described herein as implementing the functionality of a miner and a peer, this is not meant to be limiting. For example, the base chain VM instance 320 can simply implement the functionality of a miner (e.g., not include the sortition executor 323, some of the functionality of the transaction processor 324, some of the functionality of the anchor block identifier 325, and/or some of the functionality of the address validator 326) and obtain blockchain data from other virtual chain node(s) 120 and/or miner device(s) 122.

The virtual chain VM instance 330 may be similar to the virtual chain VM instance 230, except the virtual chain VM instance 330 can optionally implement miner functionality as well. For example, the transaction processor 331 can perform similar operations as the transaction processor 231 of FIGS. 2A-2B. In addition, the transaction processor 331 can submit participant transactions on behalf of the virtual chain VM instance 330 in association with a virtual chain block 132. The transaction processor 331 can generate the transactions (e.g., by obtaining data from other components), specifying an amount of virtual chain cryptocurrency being locked up (e.g., for participant transactions), a base chain block height (e.g., for participant transactions), an address to receive base chain cryptocurrency (e.g., for participant transactions), and/or the like.

The anchor block identifier 332 can perform the operations described herein as being performed by the anchor block identifiers 222 and 232. The address validator 333 can perform the operations described herein as being performed by the address validators 223 and 233.

The block data store 334 can store virtual chain block 132 data, similar to the block data store 234 of FIGS. 2A-2B. While the block data store 334 is depicted as being internal to the virtual chain VM instance 330, this is not meant to be limiting. For example, the block data store 334 may reside internal to the miner device 122, but external to the virtual chain VM instance 330. In this example, the VM instances 320 and/or 330 may share access to the block data store 334.

Any of the message generator 321, the proof generator 322, the sortition executor 323, the transaction processor 324, the anchor block identifier 325, the address validator 326, the block data store 327, the key data store 328, the transaction processor 331, the anchor block identifier 332, the address validator 333, and/or the block data store 334 can communicate with each other such that the appropriate component has access to the data necessary to perform some or all of the operations described herein.

While the virtual chain VM instance 330 is described herein as implementing the functionality of a miner and a peer, this is not meant to be limiting. For example, the virtual chain VM instance 330 can simply implement the functionality of a miner (e.g., not include some of the functionality of the transaction processor 331, some of the functionality of the anchor block identifier 332, and/or some of the functionality of the address validator 333) and obtain blockchain data from other virtual chain node(s) 120 and/or miner device(s) 122.

Figure 3B:
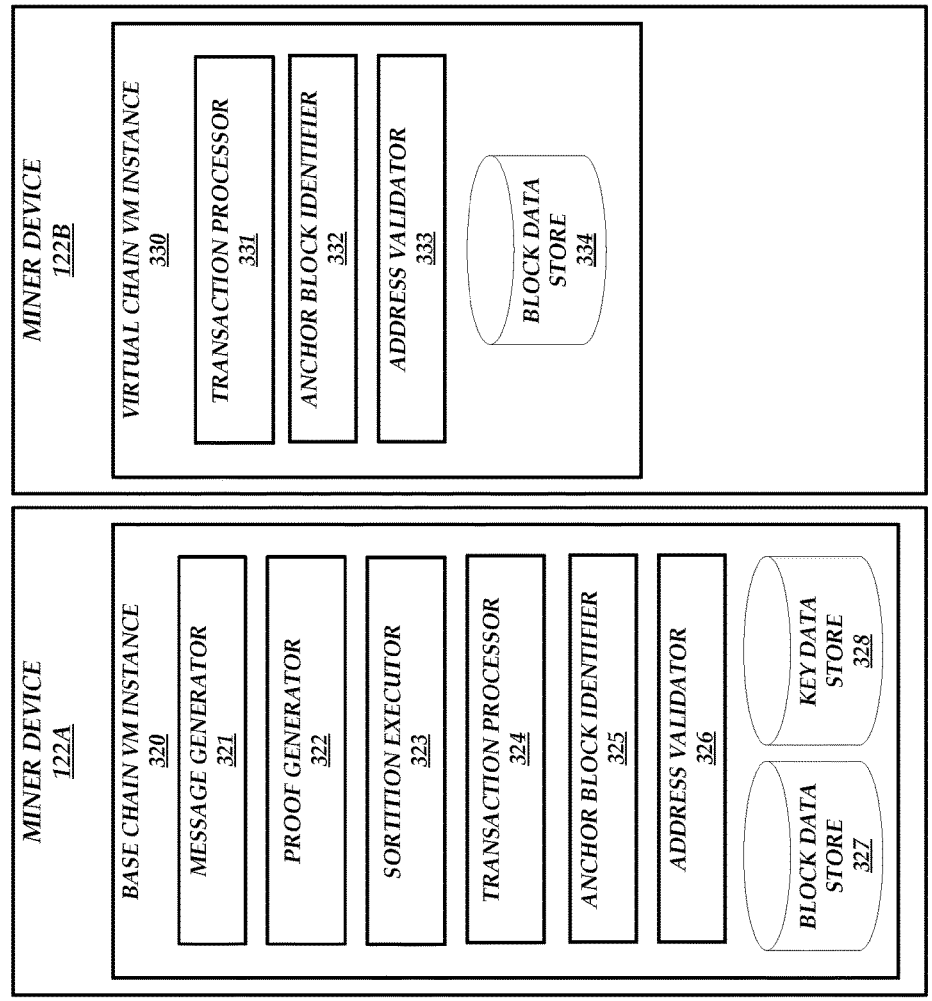
FIG. 3B is another block diagram of an illustrative operating environment in which an improved blockchain is implemented via one or more VM instances.

FIG. 3B is another block diagram of an illustrative operating environment 350 in which an improved blockchain is implemented via one or more VM instances 320 and/or 330. The operating environment 350 is similar to the operating environment 300, except that each VM instance 320 and/or 330 is initialized by a different miner device 122A-122B. While the VM instances 320 and/or 330 may be running in different miner devices 122A-122B, the VM instances 320 and/or 330 may nonetheless be configured to communicate with one another.

While not shown, a user device 124 can include a base chain VM instance that includes some or all of the same components and functionality as the base chain VM instance 220 and/or the base chain VM instance 320 and/or a virtual chain VM instance that includes some or all of the same components and functionality as the virtual chain VM instance 230 and/or the virtual chain VM instance 330. Similarly, one user device 124 can include a base chain VM instance and another user device 124 can include a virtual chain VM instance. A user device 124 can therefore perform some or all of the same functionality as a peer and/or a miner, including broadcasting participant transactions, delegate initiation transactions, and/or delegate termination transactions to a base chain and/or a virtual chain.

Example Prepare Phase and Reward Phase Operations

Figure 4:
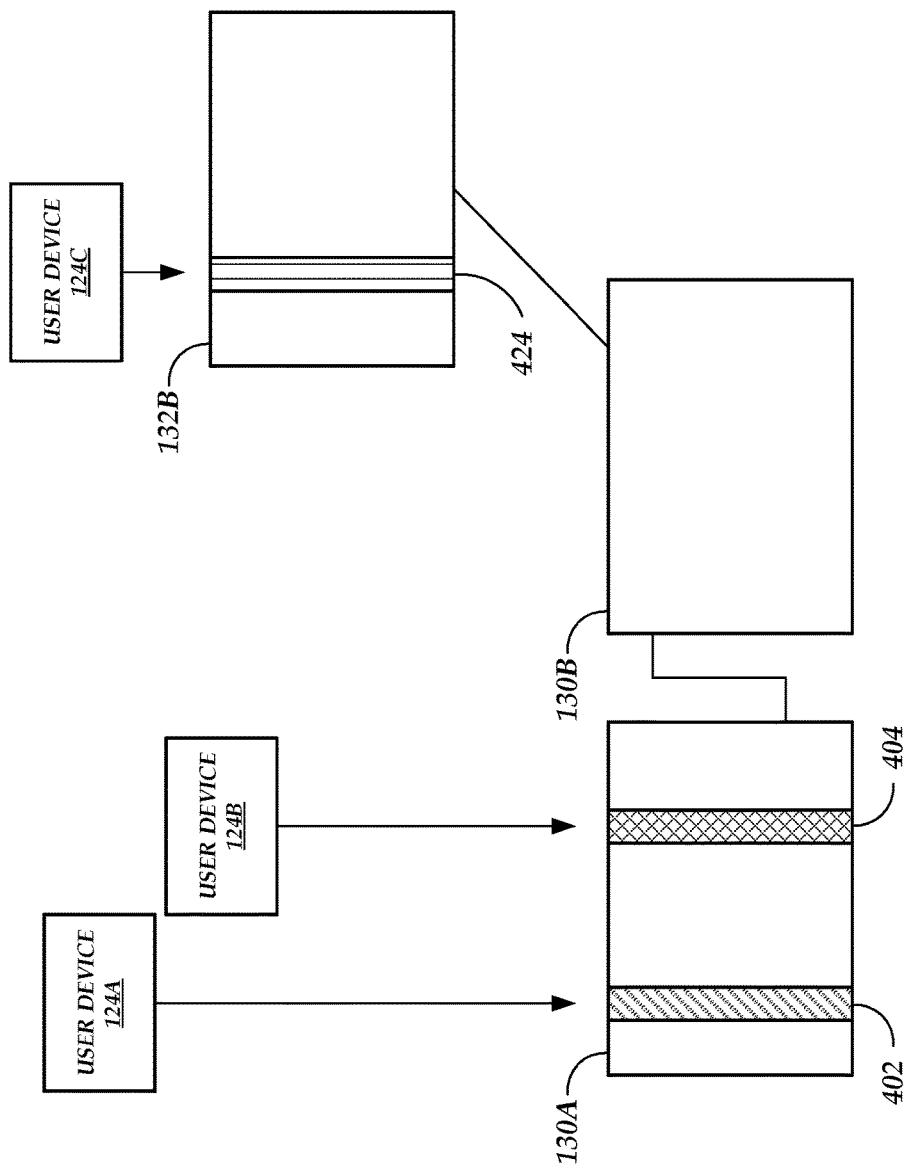
FIG. 4 is a block diagram depicting participant transactions that are submitted prior to a prepare phase.

FIG. 4 is a block diagram depicting participant transactions that are submitted prior to a prepare phase. As illustrated in FIG. 4, a base chain block 130A and a base chain block 130B are created prior to the prepare phase. In addition, a virtual chain block 132B anchored to the base chain block 130B is created prior to the prepare phase.

A user device 124A may have submitted a participant transaction 402 stored in the base chain block 130A. Similarly, a user device 124B may have submitted a participant transaction 402 also stored in the base chain block 130A. As described herein, a participant transaction can be submitted on the base chain or on the virtual chain. For example, a user device 124C may have submitted a participant transaction 424 stored in the virtual chain block 132B.

The participant transactions 402, 404, and/or 424 can include various information. For example, the participant transactions 402, 404, and/or 424 can each indicate an amount of virtual chain cryptocurrency being locked up by the respective user device 124A-C, an indication of a number of reward phases for which the virtual chain cryptocurrency is being locked up, an indication of base chain block height (e.g., where the indication may be the base chain block height of the base chain block in which the participant transaction is stored, the base chain block height of the base chain block to which the virtual chain block that includes the participant transaction is anchored, the base chain block height of a base chain block that is a parent of the base chain block in which the participant transaction is stored, the base chain block height of the parent of the base chain block to which the virtual chain block that includes the participant transaction is anchored, etc.), and/or an address for receiving base chain cryptocurrency transferred from miners that have submitted block commit transactions during the reward phase (e.g., a base chain cryptocurrency address).

The number of reward phases for which the virtual chain cryptocurrency is being locked up in the participant transactions 402, 404, and/or 424 can be for at most a defined period of time (e.g., as defined per rules or instructions stored in a block data store), such as 12 reward phases. Alternatively, the number of reward phases can be indicated in terms of a length of time (e.g., 1 month, 2 months, 3 months, etc.), or a number of base chain blocks (e.g., 1000 blocks, 2000 blocks, 3000 blocks, etc.). The number of reward phases for which the virtual chain cryptocurrency is being locked up in the participant transactions 402, 404, and/or 424 can also be for at least a defined period of time (e.g., as defined per rules or instructions stored in a block data store), such as 1 reward phase. In other words, a user device 124A-C can submit a participant transaction in which the indicated amount of virtual chain cryptocurrency is locked up for at least a minimum amount of time (or minimum number of base chain blocks or reward phases) and/or at most a maximum amount of time (or maximum number of base chain blocks or reward phases).

While the participant transactions 402, 404, and/or 424 are described herein as including the information described above, this is not meant to be limiting. A user device 124A-C can submit any number of participant transactions that include some or all of the information described above. Thus, a user device 124A-C could submit a first participant transaction that indicates a base chain block height, a second participant transaction that identifies an address to which base chain cryptocurrency should be transferred, and so on.

While the participant transactions 402, 404, and/or 424 are depicted in FIG. 4 as being submitted by user devices 124A-C, this is not meant to be limiting. For example, a virtual chain node 120 and/or a miner device 122 can submit a participant transaction.

In some embodiments, a user device 124A-C (or virtual chain node 120 or miner device 122) can submit a participant transaction based on the virtual chain cryptocurrency holdings of the user operating the user device 124A-C. In other embodiments, a user device 124A-C (or virtual chain node 120 or miner device 122) can act as a delegate for another user device 124A-C (or virtual chain node 120 or miner device 122) that participates in the peer-to-peer network. A delegate can sign and broadcast participant transactions on behalf of a represented entity, thereby allowing the owner of the represented entity to contribute to the security and reliability of the virtual chain via the delegate. The delegate relationship may help combat against potential attacks on the stability of the virtual chain by miners that may attempt to mine hidden forks, hide eventually invalid forks, and/or other forms of miner misbehavior.

For example, at any time a virtual chain node 120, miner device 122, or user device 124 can broadcast to the base chain and/or the virtual chain a delegate initiation transaction to establish a delegate relationship. The delegate initiation transaction can indicate an address of a virtual chain node 120, miner device 122, or user device 124 that will be represented by a delegate and/or an address of a virtual chain node 120, miner device 122, or user device 124 that will be acting as a delegate for the device submitting the delegate initiation transaction. The delegation initiation transaction can also include an indication of an end base chain block, which can be represented by a base chain block height at which the delegate relationship is to be terminated (unless a subsequent delegate initiation transaction submitted by the device being represented updates the delegate relationship); an indication of a delegated amount, which can be the total amount of virtual chain cryptocurrency originating from an address of the device being represented that can be used by the delegate when the delegate submits participant transactions on behalf of the device being represented; and optionally a reward address, which can be a base chain cryptocurrency address that the delegate must designate as the address to receive base chain cryptocurrency from miners that submit block commit transactions. If the delegate initiation transaction does not specify a reward address, then the delegate, when submitting a participant transaction, can select the address to receive base chain cryptocurrency from miners.

At any time, a virtual chain node 120, miner device 122, or user device 124 being represented by a delegate can broadcast to the base chain and/or the virtual chain a delegate termination transaction to terminate the delegate relationship. The delegate termination transaction can include an indication of an address of a virtual chain node 120, miner device 122, or user device 124 currently acting as a delegate for the device submitting the delegate termination transaction for which the delegate relationship should be terminated.

If a virtual chain node 120 receives a delegate initiation transaction, the virtual chain node 120 can store the information stored in the transaction (e.g., in the block data store 225 and/or block data store 234). The address validator 223 can then use the stored delegation initiation transaction information to determine whether a participant transaction is submitted by a delegate (e.g., where the participant transaction may include an address of the delegate as a source of the transaction, and the address validator 223 can use stored delegation initiation transaction information to determine whether any delegate initiation transaction was submitted identifying this address as the address of a delegate and, if so, whether this delegation is still valid (e.g., whether the indicated end block has been reached, whether a delegate termination transaction was subsequently submitted, etc.)), and, if so, determine whether an address included in a participant transaction submitted by a delegate is valid or invalid as part of the determination as to whether the address should be included in the set of reward addresses (e.g., where the address validator 223 may determine that the address is invalid if the address included in the participant transaction does not match the reward address specified in the delegate initiation transaction that identifies the address of the device that submitted the participant transaction as a delegate address, and where the address validator 223 may determine that the address is valid if the address included in the participant transaction does match the reward address specified in the delegate initiation transaction that identifies the address of the device that submitted the participant transaction as a delegate address or if the delegate initiation transaction did not identify any reward address). A miner device 122 and/or user device 124 can perform similar actions to determine whether the address included in a participant transaction submitted by a delegate should be included in a set of reward addresses.

In some embodiments, a given device may have at most one delegate. If the device subsequently submits another delegate initiation transaction, then the newly identified delegate may replace the originally identified delate. In other embodiments, a given device can have multiple delegates. A given device can serve as a delegate for one or more other devices.

Figure 5:
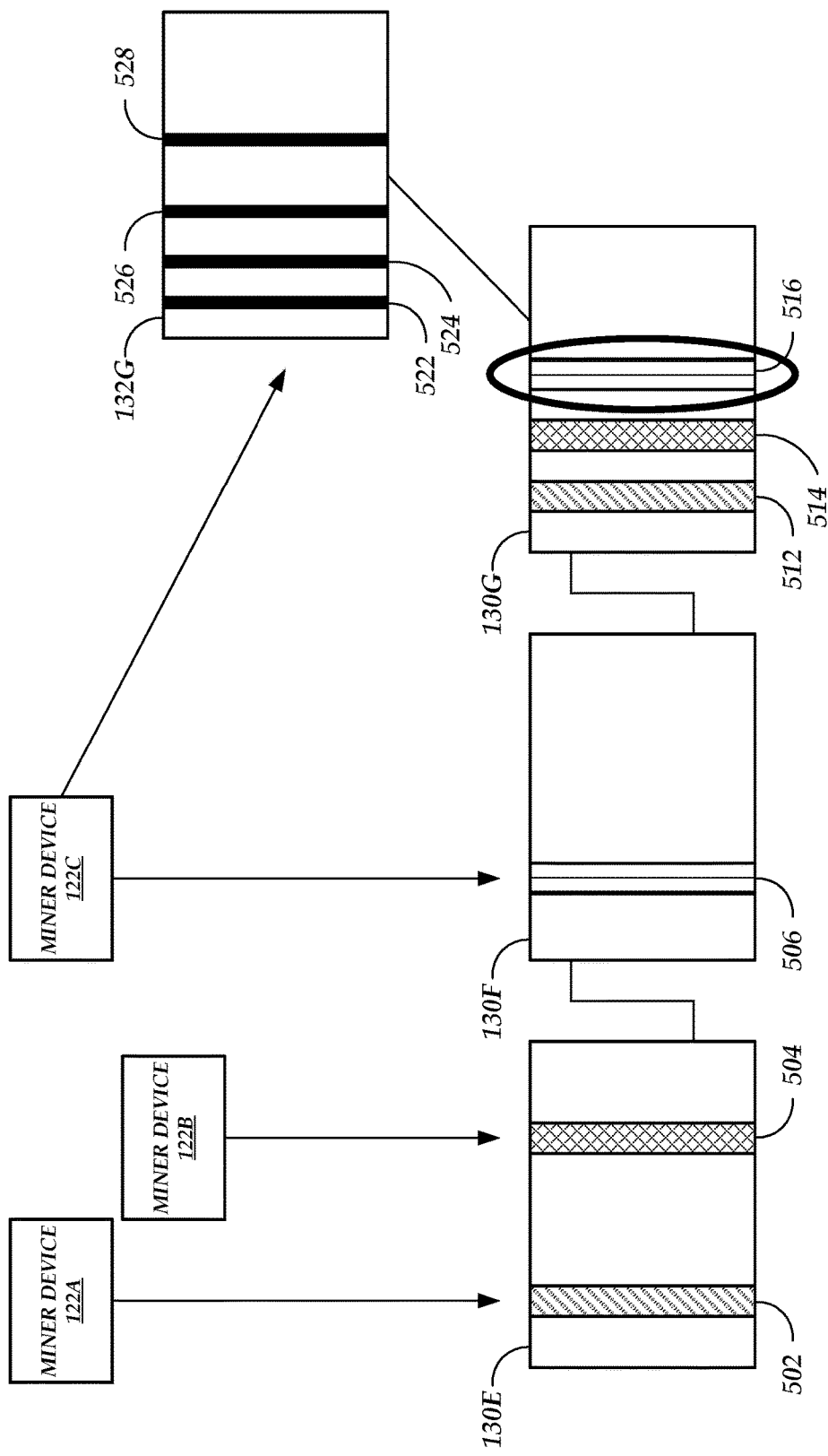
FIG. 5 is a block diagram depicting a process by which various miner devices can participate in a single-leader election for the right to form a new virtual chain block during a reward phase.

FIG. 5 is a block diagram depicting a process by which various miner devices 122A-C can participate in a single-leader election for the right to form a new virtual chain block 132C during a reward phase. As illustrated in FIG. 5, a base chain VM instance 320 running on the miner device 122A has submitted a public key registration transaction 502 in base chain block 130E. The public key registration transaction 502 may include a public key of the base chain VM instance 320 running on the miner device 122A (which may be the public key of the miner device 122A if a single VM instance is running on the miner device 122A).

Similarly, a base chain VM instance 320 running on the miner device 122B has submitted a public key registration transaction 504 in the base chain block 130E. The public key registration transaction 504 may include a public key of the base chain VM instance 320 running on the miner device 122B.

Because the base chain VM instances 320 running on the miner devices 122A-B have submitted public key registration transactions in association with the base chain block 130E, these base chain VM instances 320 can begin participating in elections that occur in association with any base chain block 130 that is a child of the base chain block 130E. For example, these base chain VM instances 320 running on miner devices 122A-B can participate in an election that occurs in association with base chain block 130F (which is a child block of the base chain block 130E) or can participate in an election that occurs in association with base chain block 130G (which is a child block of the base chain block 130F).

A base chain VM instance 320 running on the miner device 122C may submit a public key registration transaction 506 in the base chain block 130F. The public key registration transaction 506 may include a public key of the base chain VM instance 320 running on the miner device 122C. Thus, the base chain VM instance 320 running on the miner device 122C can participate in an election that occurs in association with any base chain block 130 that is a child of the base chain block 130F (e.g., the base chain block 130G).

As described herein, a base chain VM instance 320 submits a block commit transaction in association with a base chain block 130 to participate in an election associated with the baes chain block 130. Here, the base chain VM instance 320 running on the miner device 122A submits a block commit transaction 512 in association with the base chain block 130G. Similarly, the base chain VM instance 320 running on the miner device 122B submits a block commit transaction 514 in association with the base chain block 130G, and the base chain VM instance 320 running on the miner device 122C submits a block commit transaction 516 in association with the base chain block 130G. Each of the block commit transactions 512, 514, and 516 may indicate an amount of cryptocurrency that has been committed and may include a hash of the VRF proof of the respective base chain VM instance 320.

Each miner device 122A-C, other miner devices 122, and/or virtual chain nodes 120 may independently conduct a sortition based on the block commit transactions 512, 514, and 516 to determine a leader of virtual chain block 132G, which may be the next block in the virtual chain and which may be anchored to the base chain block 130G (e.g., anchored to the block in the base chain for which a sortition is occurring). The base chain VM instances 320 running on the miner devices 122A-C may each have a probability of being selected as a leader that is based on the amount of cryptocurrency committed in the respective block commit transactions 512, 514, and 516.

Here, the base chain VM instance 320 running on the miner device 122C is selected as the leader of the virtual chain block 132G. Thus, the base chain VM instance 320 running on the miner device 122C is awarded a block reward and can obtain transaction fees for each transactions stored on the virtual chain block 132G. For example, the base chain VM instance 320 running on the miner device 122C can obtain transaction fees for various transactions 522, 524, 526, and 528 that are stored or encoded in the virtual chain block 132G.

In some embodiments, the leader selected to create a virtual chain block 132 may receive a percentage of the block reward (e.g., 60%) and one or more leaders selected to create one or more previous virtual chain blocks 132 may receive a remaining percentage of the block reward (e.g., 40%). In other words, a base chain VM instance 220 and/or 320 can apply a smoothing function during the sortition to determine the percentage of the block reward to be transferred to the selected leader and the percentage of the block reward to be transferred to one or more previously selected leaders. By staggering the block reward payout to a selected leader over two or more virtual chain blocks 132, a miner device 122 may be disincentivized from only submitting block commit transactions for sortitions in a reward phase in which the same miner device 122 has an address in the set of reward addresses, thereby improving the security and reliability of the virtual chain.

Because the base chain VM instance 320 running on the miner device 122C is selected as the leader of the virtual chain block 132G, the base chain VM instance 320 running on the miner device 122C may form the virtual chain block 132G by inserting a VRF proof generated by the base chain VM instance 320 (or a hash of the VRF proof, which is a message) into a header of the virtual chain block 132G. The VRF proof can then be used to perform a future sortition.

In association with the submissions of the block commit transactions 512, 514, and 516, each miner device 122A-C may transfer the committed base chain cryptocurrency to one or more reward addresses in a set of reward addresses or to a burn address. For example, if the block commit transaction 512 submitted by the miner device 122A includes a reference to a base chain block 130 that descends from an anchor block identified during the prepare phase, then the miner device 122A may transfer the base chain cryptocurrency committed in the block commit transaction 512 to one or more addresses in a set of reward addresses identified during the prepare phase (e.g., performing a similar type of sortition to identify which addresses in the set of reward addresses to select). However, if the block commit transaction 512 submitted by the miner device 122A includes a reference to a base chain block 130 that does not descend from an anchor block identified during the prepare phase, then the miner device 122A may transfer the base chain cryptocurrency committed in the block commit transaction 512 to a burn address.

Similarly, if the block commit transaction 514 submitted by the miner device 122B includes a reference to a base chain block 130 that descends from an anchor block identified during the prepare phase, then the miner device 122B may transfer the base chain cryptocurrency committed in the block commit transaction 514 to one or more addresses in a set of reward addresses identified during the prepare phase (e.g., performing a similar type of sortition to identify which addresses in the set of reward addresses to select). Otherwise, if the block commit transaction 514 submitted by the miner device 122B includes a reference to a base chain block 130 that does not descend from an anchor block identified during the prepare phase, then the miner device 122B may transfer the base chain cryptocurrency committed in the block commit transaction 514 to a burn address. The miner device 122C may perform similar operations to determine to which address(es) to transfer the base chain cryptocurrency committed in the block commit transaction 516.

Prepare Phase and Reward Phase Control Plane Diagram

Figure 6:
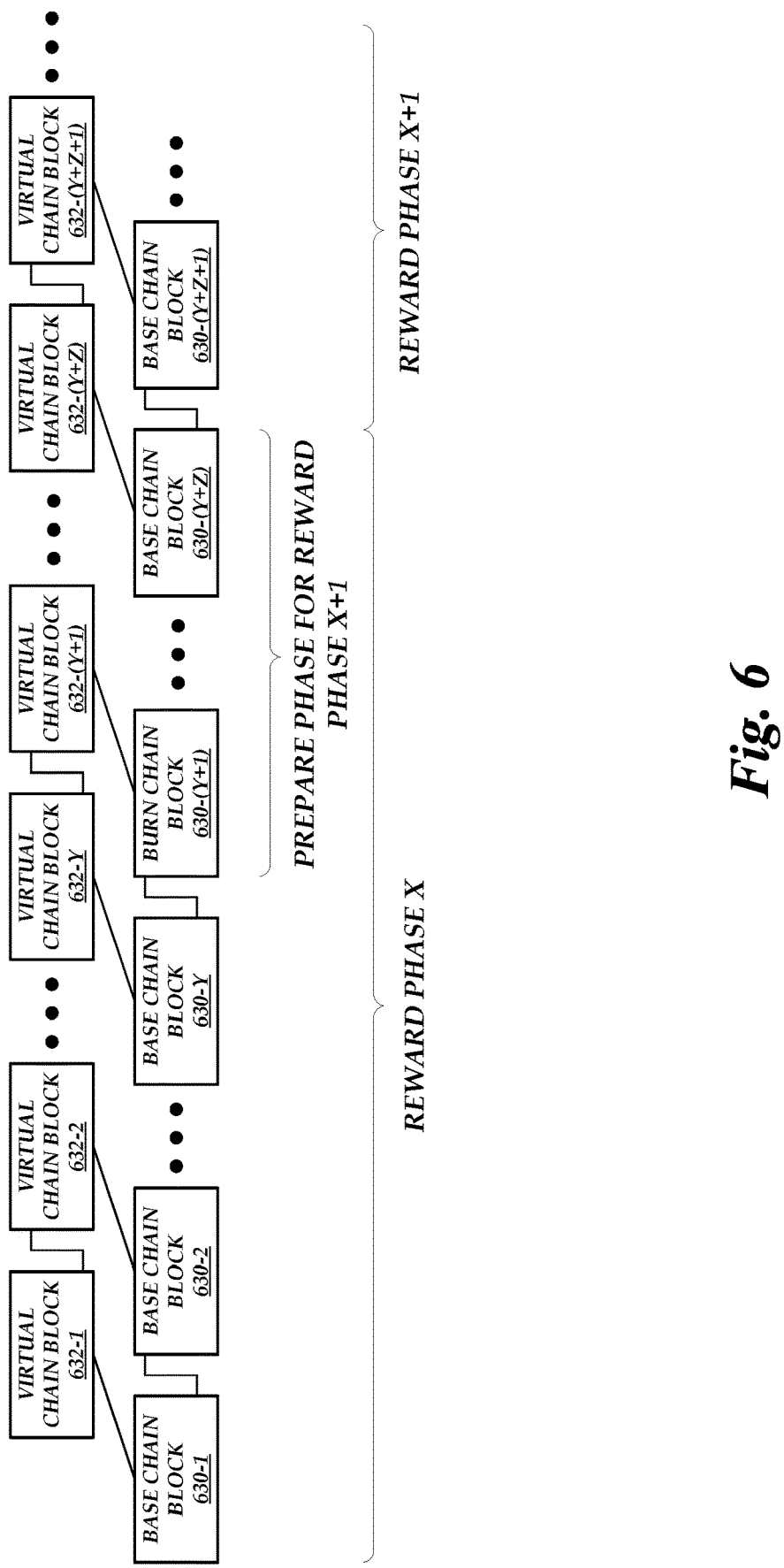
FIG. 6 is a block diagram depicting base chain blocks and virtual chain blocks associated with a prepare phase and/or a reward phase.

FIG. 6 is a block diagram depicting base chain blocks 630 and virtual chain blocks 632 associated with a prepare phase and/or a reward phase. As illustrated in FIG. 6, a portion of the reward phase overlaps with the prepare phase, and each reward phase follows the previous reward phase (optionally with no separate, in terms of base chain blocks and/or virtual chain blocks, between each successive reward phase).

For example, base chain blocks 630-1 through 630-(Y+Z) may be created during a reward phase X, where the reward phase X may be defined has having a duration equal to the number of base chain blocks 630 that fall between and include base chain blocks 630-1 through 630-(Y+Z). The reward phase X may have been directly preceded by both the reward phase X−1 and a prepare phase for the reward phase X. The latter portion of the reward phase X may include a prepare phase for reward phase X+1. Reward phase X+1 may directly follow reward phase X and the prepare phase for reward phase X+1, where base chain block 630-(Y+Z+1) may represent the first base chain block created during the reward phase X+1.

Base chain blocks 630-(Y+1) through 630 (Y+Z) may be created during the reward phase X and during the prepare phase for the next reward phase, reward phase X+1. Participant transactions can be broadcast to the base chain during the prepare phase for reward phase X+1 and/or prior to the prepare phase for reward phase X+1 to affect the anchor block and/or set of reward addresses chosen for the reward phase X+1. In addition, virtual chain blocks 632-1 through 632-(Y+Z) may be anchored to corresponding base chain blocks 630-1 through 630-(Y+Z), respectively, and may be created during the reward phase X. Participant transactions can optionally be broadcast to the virtual chain during the reward phase X and prior to the prepare phase for the reward phase X+1 to affect the anchor block and/or set of reward addresses chosen for the reward phase X+1. In some embodiments, the anchor block chosen for reward phase X+1 may be a block in the virtual chain created prior to the virtual chain block 632-(Y+1), which represents the first virtual chain block created during the prepare phase for the reward phase X+1.

Example Prepare Phase Flow Diagram

Figure 7:
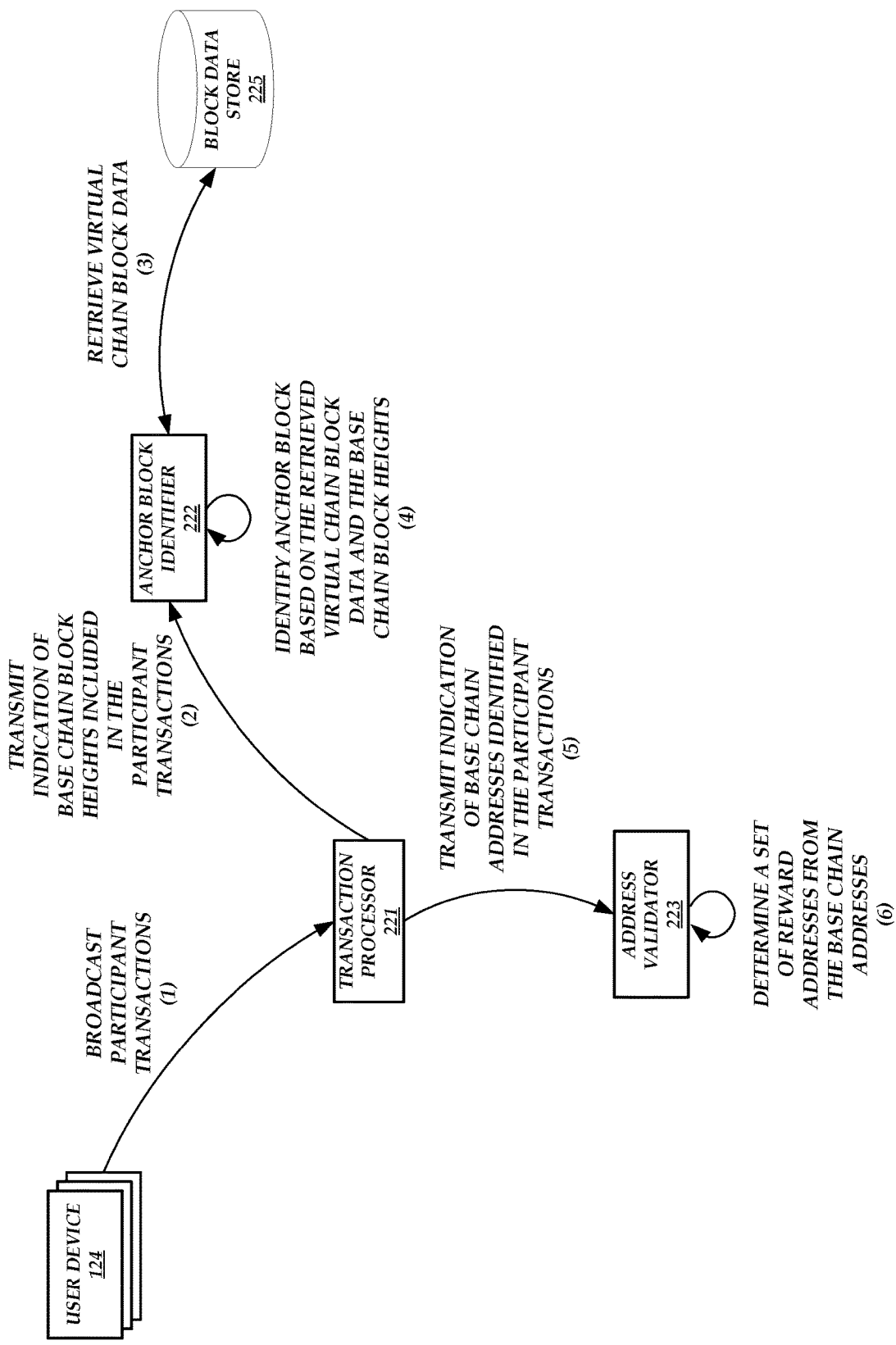
FIG. 7 is a flow diagram illustrating the operations performed by the components of the operating environment of FIGS. 2A-2B to select an anchor block and a set of reward addresses during a prepare phase.

FIG. 7 is a flow diagram illustrating the operations performed by the components of the operating environment 200, 250 of FIGS. 2A-2B to select an anchor block and a set of reward addresses during a prepare phase. The operations described with respect to FIG. 7 can also be performed by a miner device 122 and/or a user device 124. As illustrated in FIG. 7, one or more user devices 124 can broadcast participant transactions at (1) to the base chain and/or to the virtual chain. Alternatively or in addition, virtual chain nodes 120 and/or miner devices 122 can also broadcast participant transactions. The participant transactions may be broadcast prior to the prepare phase (if broadcast to the virtual chain) or during the prepare phase (if broadcast to the base chain).

The transaction processor 221 can receive the broadcasted participant transactions, and can transmit an indication of the base chain block heights included in the participant transactions to the anchor block identifier 222 at (2). The anchor block identifier 222 can retrieve virtual chain block data from the block data store 225 (and/or from the block data store 234) at (3). The anchor block identifier 222 can then identify an anchor block based on the retrieved virtual chain block data and the base chain block heights included in the participant transactions at (4).

For example, the anchor block identifier 222 can identify an ancestor block for each virtual chain block created during the prepare phase, where the anchor block identifier 222 identifies an ancestor block as being the block that is an ancestor of the respective virtual chain block and that was most recently created prior to the prepare phase. The anchor block identifier 222 can then determine how many times a particular ancestor block is identified as the most recent ancestor block of a virtual chain block created during the prepare phase. The anchor block identifier 222 can then determine whether the ancestor block identified the most times as being the most recent anchor block of a virtual chain block created during the prepare phase (e.g., the most common ancestor block) is the ancestor block for a threshold percentage of the virtual chain blocks created during the prepare phase and/or is a block that descends from one or more virtual chain blocks that collectively include (and/or are anchored to base chain block(s) that collectively include) a second threshold percentage of participant transactions that identify a base chain block height that is within a threshold block height of a current block height of the base chain. If this most common ancestor block satisfies one or both threshold percentages, then the anchor block identifier 222 identifies the most common ancestor block as the anchor block for the upcoming reward phase.

Before, during, and/or after transmitting an indication of the base chain block heights included in the participant transactions to the anchor block identifier 222, the transaction processor 221 can transmit an indication of base chain addresses identified in the participant transactions to the address validator 223 at (5). The address validator 223 can determine a set of reward addresses from the base chain addresses included in the participant transactions at (6). For example, the address validator 223 can include a base chain address in the set of reward addresses if the base chain address corresponds to a participant transaction in which a threshold percentage of virtual chain cryptocurrency is being locked up and/or if the base chain address matches an address included in a delegate initiation transaction (e.g., if the participant transaction that includes the base chain address was submitted by a user device 124 acting as a delegate). The address validator 223 can repeat this process until all base chain addresses included in the received participant transactions are evaluated. If the number of addresses in the set of reward addresses falls below a number derived from an available number of slots in the reward phase, then the address validator 223 can fill the set of reward addresses with a number of burn addresses that matches the difference between the number of addresses in the set of reward addresses and the number derived from the available number of slots in the reward phase.

Example Reward Phase Flow Diagrams

Figure 8A:
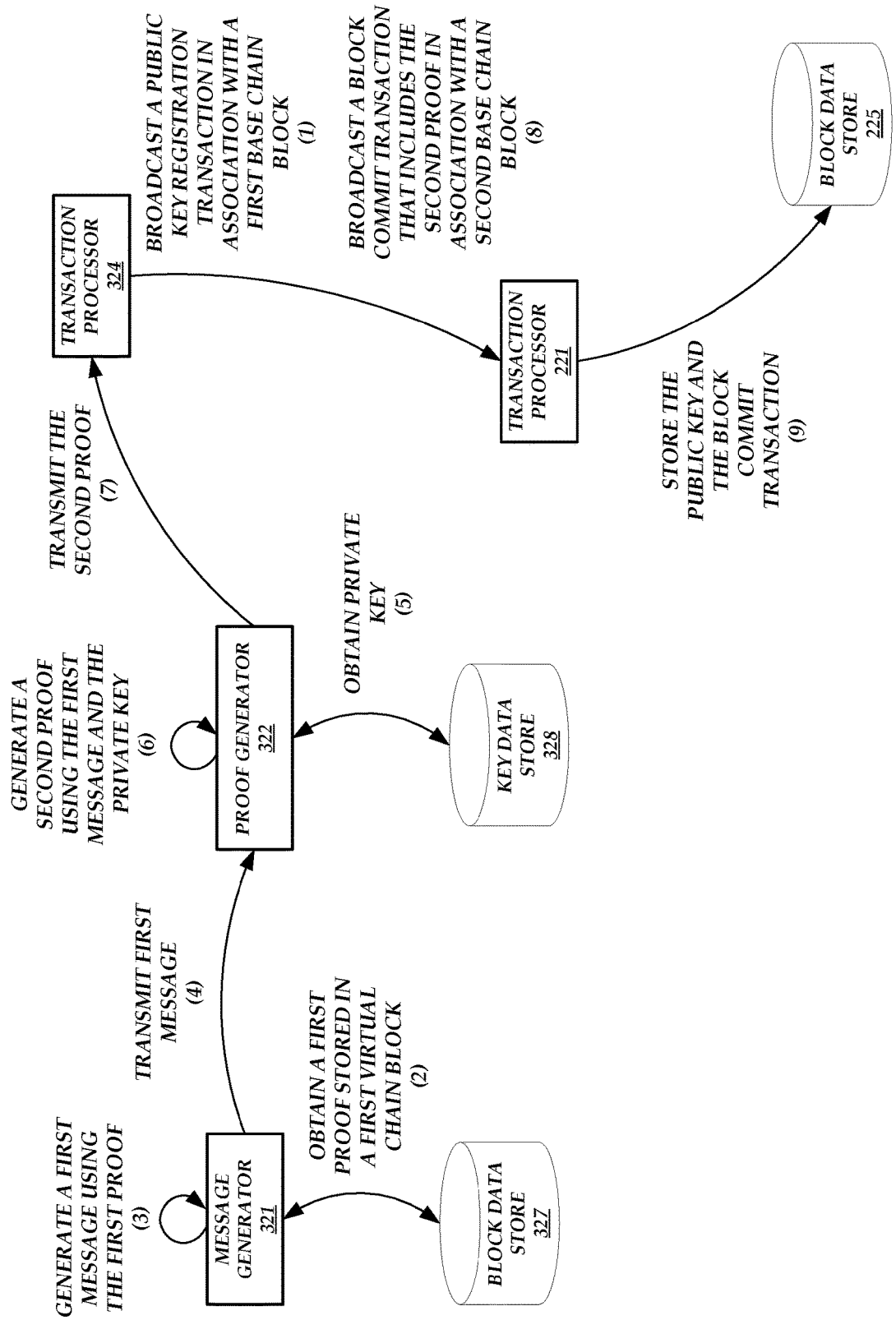
FIGS. 8A-8C are flow diagrams illustrating the operations performed by the components of the operating environment of FIGS. 2A through 3B to perform a sortition for selecting a leader of a next block in the virtual chain during a reward phase.
Figure 8B:
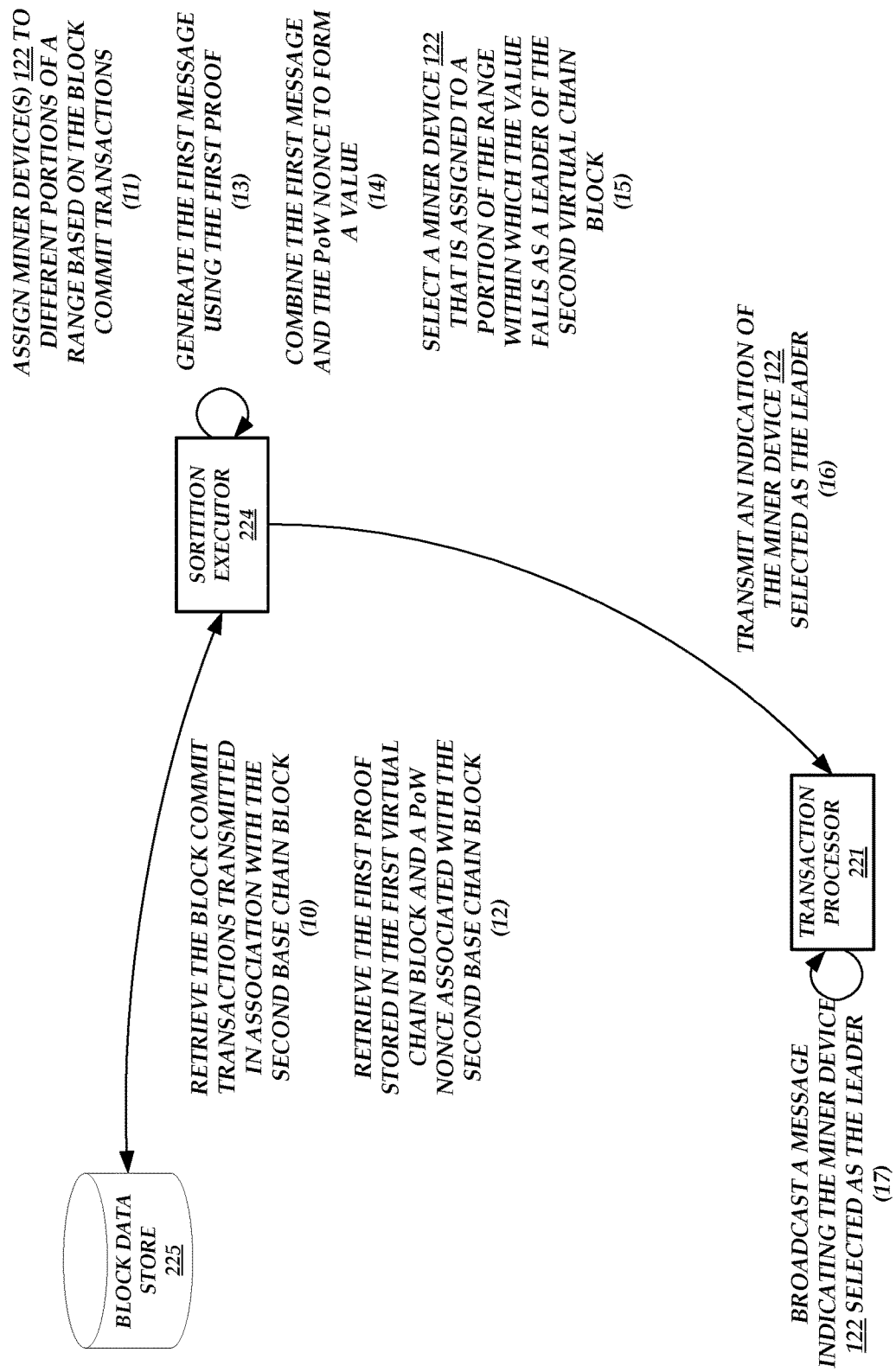
Figure 8C:
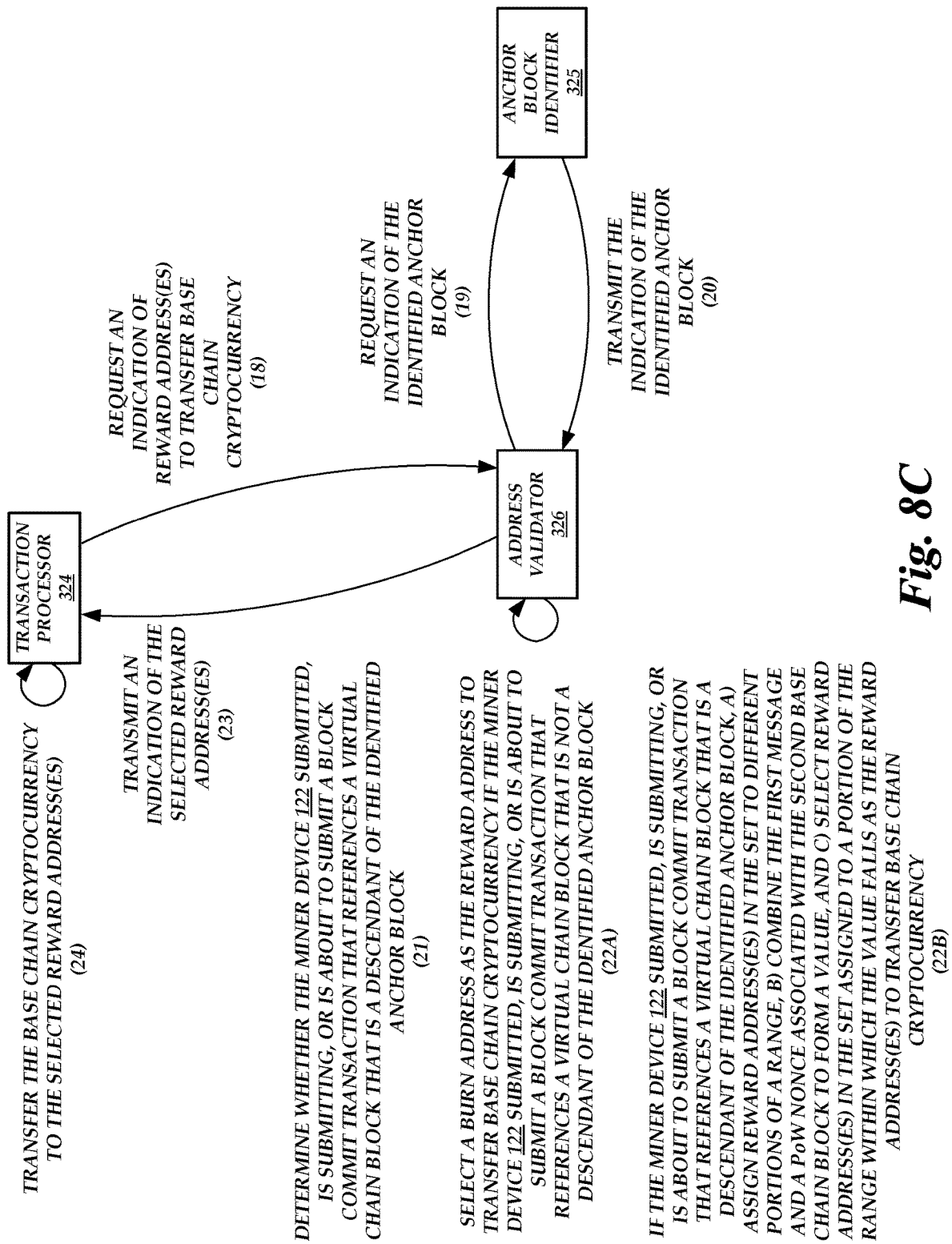

FIGS. 8A-8C are flow diagrams illustrating the operations performed by the components of the operating environment 200, 250, 300, and/or 350 of FIGS. 2A through 3B to perform a sortition for selecting a leader of a next block in the virtual chain during a reward phase. As illustrated in FIG. 8A, the transaction processor 324 broadcasts a public key registration transaction in association with a first base chain block at (1). The broadcast can be received by the transaction processor 221 of a virtual chain node 120 (and/or other participants in the peer-to-peer network). Thus, the corresponding base chain VM instance 320 can participate in an election starting with the next block in the base chain.

To participate in an election, the base chain VM instance 320 may need to submit a block commit transaction. To do so, the message generator 321 may obtain a first proof stored in a first virtual chain block from the block data store 327 at (2). For example, the first proof may be a VRF proof stored in a header of the first virtual chain block. In some embodiments, the first virtual chain block may be anchored to the first base chain block. Generally, if the base chain VM instance 320 is attempting to participate in an election to be chosen as the leader of the next block in the virtual chain, the message generator 321 may obtain the VRF proof stored in the previous virtual chain block (e.g., the block in the virtual chain that will become the parent block of the next block in the virtual chain).

The message generator 321 can then generate a first message using the first proof at (3). For example, the message generator 321 can hash the first proof to form the first message. Once the first message is generated, the message generator 321 can transmit the first message to the proof generator 322 at (4).

The proof generator 322 can obtain a private key from the key data store 328 at (5). The proof generator 322 can then generate a second proof using the first message and the private key at (6). For example, the second proof may be a VRF proof unique or specific to the base chain VM instance 320 of the proof generator 322 (e.g., a VRF proof unique or specific to a node). The proof generator 322 can generate the second proof by performing an elliptic curve algorithm (e.g., algebraic operations performed on elliptic curve points), which includes generating a hash of the message and the private key. Because generation of the second proof (e.g., a VRF proof) relies on a miner's private key, each miner participating in the election may generate a different VRF proof.

Once the second proof is generated, the proof generator 322 can transmit the second proof to the transaction processor 324 at (7). The transaction processor 324 can then generate and broadcast a block commit transaction that includes a hash of the second proof in association with a second base chain block at (8) (where the proof generator 322 or the transaction processor 324 can generate the hash of the second proof). For example, the first base chain block may be a parent block of the second base chain block, and therefore the base chain VM instance 320 can participate in the election occurring in association with the second base chain block because the public key was registered in association with the first base chain block. The block commit transaction may indicate an amount of cryptocurrency being committed, where the type of cryptocurrency is based on the coinbase of the base chain. The transaction processor 324 can broadcast the block commit transaction to one or more nodes participating in the improved blockchain, peer-to-peer network, such as the transaction processor 221. The transaction processor 221 can store the registered public key and/or the block commit transaction in the block data store 225 at (9).

Various base chain VM instances 320 may broadcast messages indicating that block commit transactions have been executed. As illustrated in FIG. 8B, the sortition executor 224 can obtain these messages, and use data included in the messages to perform a single-leader election. For example, the sortition executor 224 can retrieve, from the block data store 225, block commit transactions transmitted in association with the second base chain block at (10). The sortition executor 224 can then assign miner device(s) 122 different portions of a range based on the block commit transactions at (11). For example, the sortition executor 224 can use the block commit transactions broadcast by the various base chain VM instances 320 to determine an amount of cryptocurrency committed by each of the base chain VM instances 220 in association with the second base chain block. The sortition executor 224 can use the amounts to determine a probability that a given base chain VM instance 320 should be selected as a leader (e.g., the probability that a given base chain VM instance 320 should be selected as a leader may be determined to be equivalent to a percentage of the total amount committed that was committed by the respective base chain VM instance 320). The sortition executor 224 can then assign each base chain VM instance 320 a portion of a range of values, where the length of the portion corresponds to the determined probability for the respective base chain VM instance 320.

Before, during, and/or after retrieving the block commit transactions, the sortition executor 224 can retrieve the first proof stored in the first virtual chain block and a proof of work (PoW) nonce associated with the second base chain block from the block data store 225 (or the block data store 234) at (12). For example, the PoW nonce may be present in a header of the second base chain block (e.g., in a header portion of the second base chain block data structure). The sortition executor 224 can generate the first message using the first proof at (13). For example, the first proof may be a VRF proof stored in a header of the first virtual chain block. The sortition executor 224 can hash the first proof to generate the first message.

The sortition executor 224 can then combine the first message and the PoW nonce to form a value at (14). For example, the sortition executor 224 can sum, hash, or otherwise combine the first message and the PoW nonce, and compute the combination modulo $2^{256}-1$ to determine a sortition value.

Once the value is formed, the sortition executor 224 can select a miner device 122 that is assigned to a portion of the range within which the value falls as a leader of the second virtual chain block at (15). For example, the base chain VM instance 320 assigned a portion of the range of values within which the sortition value falls is then selected as the leader of the next virtual chain block (e.g., a second virtual chain block that references the first virtual chain block as a parent block). The sortition executor 224 can then transmit an indication of the miner device 122 selected as the leader to the transaction processor 221 at (16), and the transaction processor 221 can broadcast a message indicating the miner device 122 selected as the leader at (17).

The base chain VM instance 320 selected as the leader of the next virtual chain block may obtain a block reward for being selected as the leader. The block reward may be in the form of a cryptocurrency that is different than the cryptocurrency that was committed. For example, the block reward cryptocurrency may be based on the coinbase of the virtual chain.

The base chain VM instance 320 selected as the leader of the next virtual chain block may form the next virtual chain block by inserting the second proof (e.g., the VRF proof) generated by the base chain VM instance 320 (and the hash of which is included in the winning block commit transaction) in a header of the next virtual chain block. Thus, this base chain VM instance 320 and/or other participants in the peer-to-peer network can use the second proof to form a second message that will then be used to select the next leader of the virtual chain block that will follow the next block for which a leader was just chosen.

As illustrated in FIG. 8C, before a block commit transaction is submitted at (8), as part of the submission of a block commit transaction at (8), or immediately after a block commit transaction is submitted at (8), the transaction processor 324 can request form the address validator 326 an indication of reward address(es) to which base chain cryptocurrency should be transferred at (18). The transaction processor 324 may make this request because the corresponding miner device 122 submitted, is submitting, or is about to submit a block commit transaction in an attempt to become a leader of the second virtual chain block and the committed base chain cryptocurrency needs to be transferred as a result. However, any transaction processor described herein can make the same request to determine where the underlying miner device 122 and/or other miner devices 122 in the peer-to-peer network should be transferring base chain cryptocurrency (and/or to store this information for the purposes of having at least a partially complete copy of the virtual chain).

The address validator 326 can request an indication of the anchor block identified for the reward phase from the anchor block identifier 325 at (19). The anchor block identifier 325 can then transmit an indication of the anchor block identified for the reward phase to the address validator 326 at (20).

The address validator 326 can then determine whether the corresponding miner device 122 submitted, is submitting, or is about to submit a block commit transaction that references a virtual chain block that is a descendant of the identified anchor block at (21). For example, the address validator 326 can determine the ancestors of the referenced virtual chain block by obtaining the second proof (e.g., the VRF proof) generated by the leader of the referenced virtual chain block (and the hash of which is included in the winning block commit transaction) and included in a header of the referenced virtual chain block and walking back down the virtual chain using the second proof and/or other virtual chain block data present in the block data store 327 and/or 334.

If the address validator 326 determines that the corresponding miner device 122 submitted, is submitting, or is about to submit a block commit transaction that references a virtual chain block that is not a descendant of the identified anchor block, then the address validator 326 selects a burn address as the reward address to which base chain cryptocurrency should be transferred at (22A). Otherwise, if the address validator 326 determines that the corresponding miner device 122 submitted, is submitting, or is about to submit a block commit transaction that references a virtual chain block that is a descendant of the identified anchor block, then the address validator 326 can (a) assign reward address(es) in the set to different portions of a range, (b) combine the first message and a PoW nonce associated with the second base chain block to form a value, and (c) select one or more reward address(es) in the set assigned to a portion of the range within which the value falls as the reward address(es) to which base chain cryptocurrency should be transferred at (22B).

The address validator 326 can then transmit to the transaction processor 324 an indication of the selected reward address(es) at (23), and the transaction processor 324 can then transfer the base chain cryptocurrency to the selected reward address(es) at (24) (e.g., if the transaction processor 324 corresponds to a miner device 122 that submitted a block commit transaction).

The address validator 326 can further remove the selected reward address(es) from the set of reward addresses such that the reward address(es) selected following the next sortition in the same reward phase may be different, thereby ensuring that each reward address in the set eventually receives transferred base chain cryptocurrency at least once during the reward phase.

Other miner devices 122, virtual chain nodes 120, and/or user devices 124 can repeat the operations described herein with respect to FIG. 8C to identify the address(es) to which base chain cryptocurrency should be transferred when a block commit transaction is submitted or is about to be submitted. Some or all of the operations of FIGS. 8A-8C may be repeated for each sortition performed during the reward phase.

While FIGS. 7 and 8A-8C depict a numbered set of operations, the numbering does not necessarily mean that such operations must be performed in the numeric order. For example, the operations depicted in FIGS. 7 and/or 8A-8C can be performed in an order that does not follow the numeric order. As an illustrative example, the operations depicted in FIG. 8C can be performed prior to the operations depicted in FIG. 8B and/or prior to operation (8) or (9) depicted in FIG. 8A.

Example Proof-of-Transfer Routine

Figure 9:
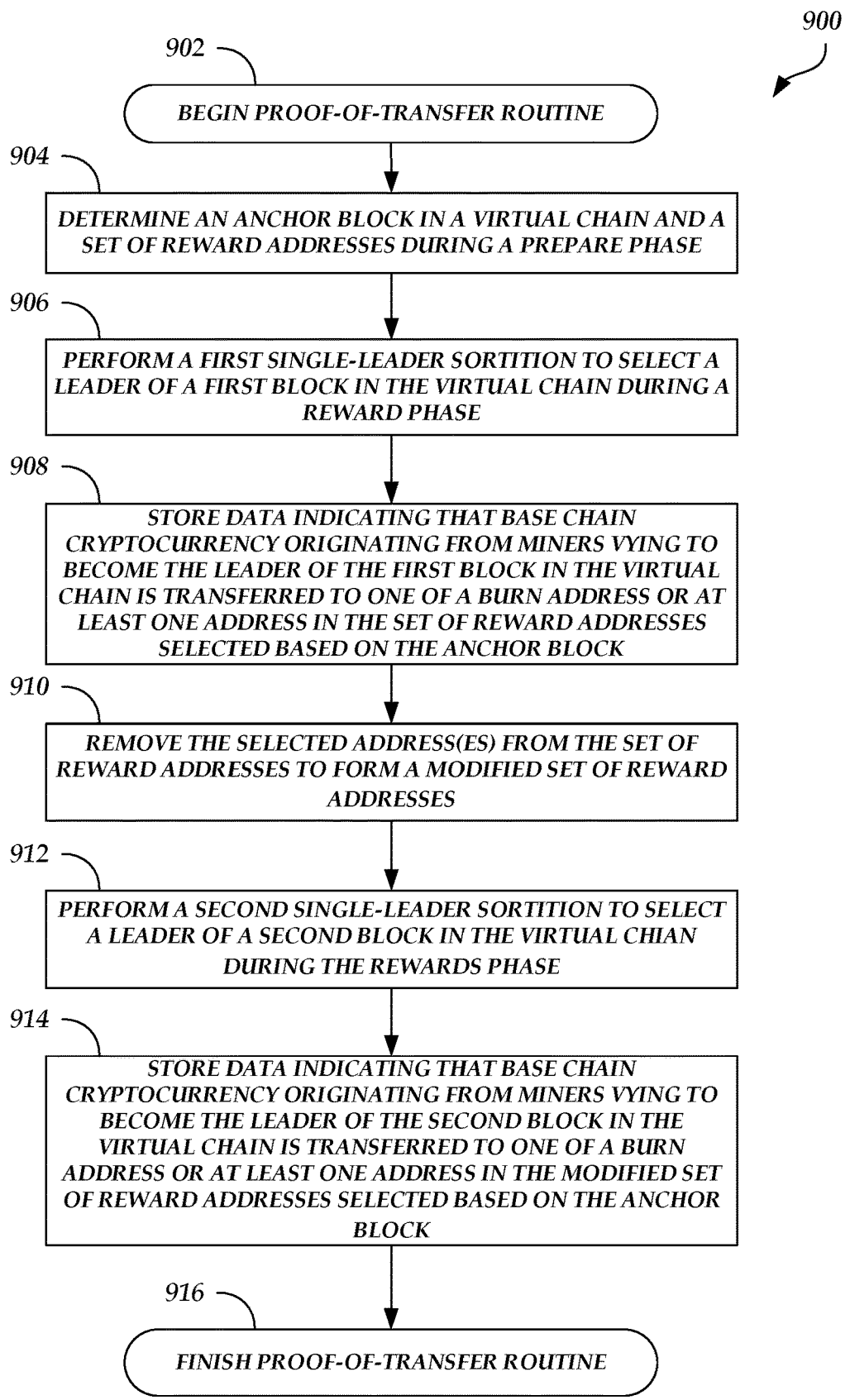
FIG. 9 is a flow diagram depicting a proof-of-transfer routine illustratively implemented by a virtual chain node, a miner device, or a user device, according to one embodiment.

FIG. 9 is a flow diagram depicting a proof-of-transfer routine 900 illustratively implemented by a virtual chain node, a miner device, or a user device, according to one embodiment. As an example, the virtual chain node 120, the miner device 122, or the user device 124 of FIG. 1, a base chain VM instance 220 running on a virtual chain node 120, a base chain VM instance 320 running on a miner device 122, and/or the like can be configured to execute the proof-of-transfer routine 900. The proof-of-transfer routine 900 begins at block 902.

At block 904, an anchor block in a virtual chain and a set of reward addresses are determined during a prepare phase. For example, the anchor block and the set of reward addresses may be determined based on participant transactions submitted before and/or during the prepare phase.

At block 906, a first single-leader sortition is performed to select a leader of a first block in the virtual chain during a reward phase. For example, the leader may be chosen based on block commit transactions broadcast by one or more miners.

At block 908, data is stored indicating that base chain cryptocurrency originating from miners vying to become the leader of the first block in the virtual chain is transferred to one of a burn address or at least one address in the set of reward addresses selected based on the anchor block. For example, the routine 900 may determine that the base chain cryptocurrency is transferred to a burn address if the corresponding miner attempted to become the leader of a block that does not descend (directly or indirectly) from the anchor block. On the other hand, the routine 900 may determine that the base chain cryptocurrency is transferred to at least one address in the set of reward addresses if the corresponding miner attempted to become the leader of a block that descends directly or indirectly from the anchor block. The routine 900 can further determine which address(es) in the set of reward addresses to select by performing a sortition, similar to the single-leader sortition performed at block 906.

At block 910, if at least one address in the set of reward addresses is selected to receive the base chain cryptocurrency, the routine 900 can remove the selected address(es) from the set of reward addresses to form a modified set of reward addresses. The routine 900 can remove the selected address(es) from the set such that the selected address(es) are not selected after subsequent sortitions in the same reward phase (these address(es) could of course be selected in a subsequent reward phase if the address(es) are included in participant transactions prior to the prepare phase corresponding to the subsequent reward phase).

At block 912, a second single-leader sortition is performed to select a leader of a second block in the virtual chain during the reward phase. For example, the leader may be chosen based on block commit transactions broadcast by one or more miners.

At block 914, data is stored indicating that base chain cryptocurrency originating from miners vying to become the leader of the second block in the virtual chain is transferred to one of a burn address or at least one address in the modified set of reward addresses selected based on the anchor block. For example, the routine 900 may determine that the base chain cryptocurrency is transferred to a burn address if the corresponding miner attempted to become the leader of a block that does not descend (directly or indirectly) from the anchor block. On the other hand, the routine 900 may determine that the base chain cryptocurrency is transferred to at least one address in the modified set of reward addresses if the corresponding miner attempted to become the leader of a block that descends directly or indirectly from the anchor block. The routine 900 can further determine which address(es) in the modified set of reward addresses to select by performing a sortition, similar to the single-leader sortition performed at blocks 906 or 912. Thus, the same anchor block and set of reward addresses determined during the prepare phase may be used to determine to where base chain cryptocurrency is transferred prior to each sortition in the following reward phase.

Fewer, more, or different blocks can be used as part of the routine 900. In some cases, one or more blocks can be omitted. Furthermore, it will be understood that the various blocks described herein with reference to FIG. 9 can be implemented in a variety of orders, or can be performed concurrently. For example, block 908 can be performed prior to block 906, and block 914 can be performed prior to block 912.

Example Consensus Routine

Figure 10:
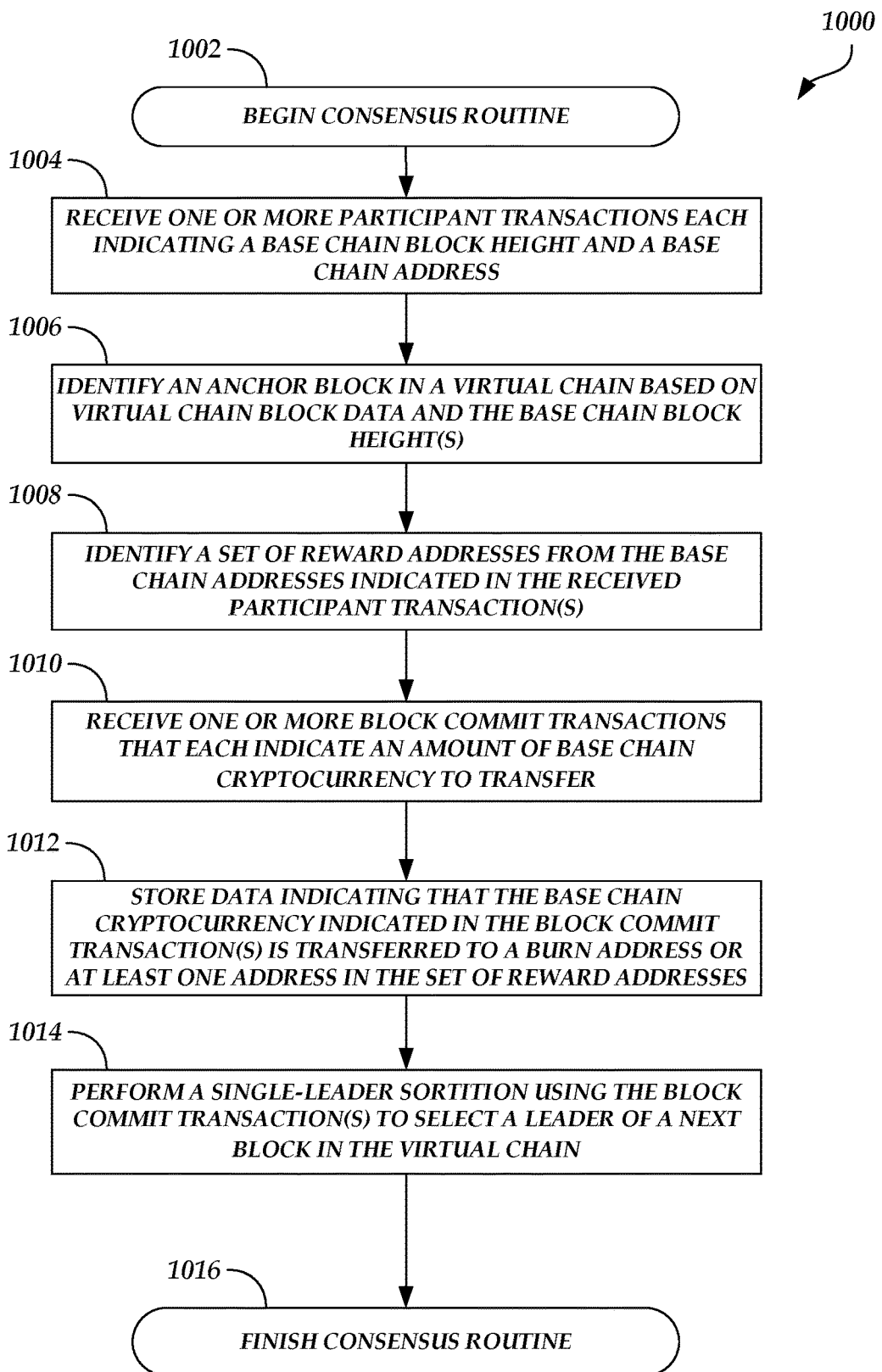
FIG. 10 is a flow diagram depicting a consensus routine illustratively implemented by a virtual chain node, a miner device, or a user device, according to one embodiment.

FIG. 10 is a flow diagram depicting a consensus routine 1000 illustratively implemented by a virtual chain node, a miner device, or a user device, according to one embodiment. As an example, the virtual chain node 120, the miner device 122, or the user device 124 of FIG. 1, a base chain VM instance 220 running on a virtual chain node 120, a base chain VM instance 320 running on a miner device 122, and/or the like can be configured to execute the consensus routine 1000. The consensus routine 1000 begins at block 1002.

At block 1004, one or more participant transactions each indicating a base chain block height and a base chain address are received. For example, the participant transaction(s) can be broadcast before and/or during a prepare phase on the base chain and/or on the virtual chain.

At block 1006, an anchor block in a virtual chain is identified based on virtual chain block data and the base chain block height(s). For example, the anchor block can be identified by determining the most common latest ancestor block of the virtual chain blocks created during the prepare phase that was created any time before the prepare phase, determining that the most common latest ancestor block is an ancestor for a threshold percentage of the virtual chain blocks created during the prepare phase, and determining that a second threshold percentage of the participant transaction(s) are included in a virtual chain block that is an ancestor of the most common latest ancestor block or in a base chain block that serves as an anchor for a virtual chain block that is an ancestor of the most common latest ancestor block and include a base chain block height that is within a threshold block height of a current block height of the base chain.

At block 1008, a set of reward address is identified from the base chain addresses indicated in the received participant transaction(s). A base chain address included in a participant transaction may be included in the set of reward addresses if the participant transaction indicates that at least a threshold percentage of the total liquid virtual chain cryptocurrency available in the peer-to-peer network or at least a threshold percentage of the total liquid virtual chain cryptocurrency locked up in the participant transaction(s) is being locked up.

At block 1010, one or more block commit transactions that each indicate an amount of base chain cryptocurrency to transfer are received. For example, the block commit transaction(s) may be received from one or more miners vying to become a leader of a next block in the virtual chain.

At block 1012, data is stored indicating that base chain cryptocurrency indicated in the block commit transaction(s) is transferred to a burn address or at least one address in the set of reward addresses. For example, the routine 1000 may determine that the base chain cryptocurrency is transferred to a burn address if the corresponding miner is attempting to become the leader of a block that does not descend (directly or indirectly) from the anchor block. On the other hand, the routine 1000 may determine that the base chain cryptocurrency is transferred to at least one address in the set of reward addresses if the corresponding miner is attempting to become the leader of a block that descends directly or indirectly from the anchor block. The routine 1000 can further determine which address(es) in the set of reward addresses to select by performing a sortition, similar to the single-leader sortition performed at block 1014 below.

At block 1014, a single-leader sortition is performed to select a leader of a next block in the virtual chain. For example, the leader may be chosen based on the received block commit transaction(s) broadcast by one or more miners.

Fewer, more, or different blocks can be used as part of the routine 1000. In some cases, one or more blocks can be omitted. Furthermore, it will be understood that the various blocks described herein with reference to FIG. 10 can be implemented in a variety of orders, or can be performed concurrently.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or logic circuitry that implements a state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing device of a decentralized network for selecting a first miner device of one or more miner devices to create a new block, the computing device comprising:
 a network interface configured to couple the computing device to the decentralized network, wherein the decentralized network comprises a base chain and a virtual chain, and wherein blocks in the virtual chain are anchored to blocks in the base chain;
 a hardware processor; and
 a non-transitory computer readable storage medium storing program instructions for execution by the hardware processor in order to cause the computing device to:
  store data that indicates creation of a first block in the virtual chain;
  in a prepare phase corresponding to a first set of blocks on the base chain:
   identify the first block as an anchor block in a virtual chain;
  during a reward phase corresponding to a second set of blocks on the base chain, wherein the second set of blocks are created after the first set of blocks:
   (i) determine a set of reward addresses to receive at least some cryptocurrency in a plurality of cryptocurrency associated with the base chain, wherein the set of reward addresses are utilized in a consensus algorithm;
   (ii) determine that the first miner device submitted a block commit transaction that references a second block in the virtual chain that descends from the anchor block;
   (iii) store data indicating that first cryptocurrency in the plurality of cryptocurrency associated with the base chain is transferred from an address of the first miner device to at least one reward address in the set of reward addresses in response to the determination; and
   (iv) perform a single-leader sortition that results in a selection of the first miner device to create the new block in the virtual chain based at least in part on the block commit transaction.

2. The computing device of claim 1, wherein the program instructions, when executed, further cause the computing device to store, during the reward phase, second data indicating that second cryptocurrency in the plurality of cryptocurrency associated with the base chain is transferred from an address of a second miner device of the one or more miner devices to a burn address in response to a determination that the second miner device submitted a second block commit transaction that references a third block in the virtual chain that does not descend from the anchor block.

3. The computing device of claim 2, wherein transfer of the second cryptocurrency from the address of the second miner device to the burn address results in the second cryptocurrency being destroyed.

4. The computing device of claim 1, wherein the program instructions, when executed, further cause the computing device to remove the at least one reward address in the set of reward addresses from the set of reward addresses to form a modified set of reward addresses.

5. The computing device of claim 4, wherein the program instructions, when executed, further cause the computing device to store, during the reward phase, second data indicating that second cryptocurrency in the plurality of cryptocurrency associated with the base chain is transferred from an address of a second miner device of the one or more miner devices to at least one reward address in the modified set of reward addresses in response to a determination that the second miner device submitted a second block commit transaction that references a third block in the virtual chain that descends from the anchor block.

6. The computing device of claim 1, wherein the program instructions, when executed, further cause the computing device to process a participant transaction broadcast by a user device over the decentralized network prior to the prepare phase, wherein the participant transaction comprises an indication of a base chain address and a first amount of cryptocurrency associated with the virtual chain.

7. The computing device of claim 6, wherein the program instructions, when executed, further cause the computing device to add the base chain address to the set of reward addresses in response to a determination that the first amount of cryptocurrency is greater than a threshold percentage of a total amount of cryptocurrency associated with the virtual chain held by participants in the decentralized network.

8. The computing device of claim 1, wherein the program instructions, when executed, further cause the computing device to perform a second single-leader sortition to select the at least one reward address in the set of reward addresses.

9. The computing device of claim 1, wherein the program instructions, when executed, further cause the computing device to identify the first block as the anchor block after a last block in the first set of blocks in the base chain is created by a second miner device of the one or more miner devices.

10. A computer-implemented method for selecting a first miner device of one or more miner devices to create a new block, the computer-implemented method comprising:
under control of a computing device in a decentralized network, wherein the decentralized network comprises a base chain and a virtual chain, and wherein blocks in the virtual chain are anchored to blocks in the base chain,
storing data that indicates creation of a first block in the virtual chain;
in a prepare phase corresponding to a first set of blocks on the base chain;
identifying the first block as an anchor block in a virtual chain;
during a reward phase corresponding to a second set of blocks on the base chain, wherein the second set of blocks are created after the first set of blocks:
(i) determining a set of reward addresses to receive at least some cryptocurrency in a plurality of cryptocurrency associated with the base chain, wherein the set of reward addresses are utilized in a consensus algorithm;
(ii) determining that the first miner device submitted a block commit transaction that references a second block in the virtual chain that descends from the anchor block;
(iii) storing data indicating that first cryptocurrency in the plurality of cryptocurrency associated with the base chain is transferred from an address of the first miner device to at least one reward address in the set of reward addresses in response to the determination; and
(iv) performing a single-leader sortition that results in a selection of the first miner device to create the new block in the virtual chain based at least in part on the block commit transaction.

11. The computer-implemented method of claim 10, further comprising storing, during the reward phase, second data indicating that second cryptocurrency in the plurality of cryptocurrency associated with the base chain is transferred from an address of a second miner device of the one or more miner devices to a burn address in response to a determination that the second miner device submitted a second block commit transaction that references a third block in the virtual chain that does not descend from the anchor block.

12. The computer-implemented method of claim 11, wherein transfer of the second cryptocurrency from the address of the second miner device to the burn address results in the second cryptocurrency being destroyed.

13. The computer-implemented method of claim 10, further comprising removing the at least one reward address in the set of reward addresses from the set of reward addresses to form a modified set of reward addresses.

14. The computer-implemented method of claim 13, further comprising storing, during the reward phase, second data indicating that second cryptocurrency in the plurality of cryptocurrency associated with the base chain is transferred from an address of a second miner device of the one or more miner devices to at least one reward address in the modified set of reward addresses in response to a determination that the second miner device submitted a second block commit transaction that references a third block in the virtual chain that descends from the anchor block.

15. Non-transitory, computer-readable storage media comprising computer-executable instructions for implementing proof-of-transfer in a decentralized network, wherein the decentralized network comprises a base chain and a virtual chain, wherein blocks in the virtual chain are anchored to blocks in the base chain, and wherein the computer-executable instructions, when executed by a computer system, cause the computer system to:
store data that indicates creation of a first block in the virtual chain;
in a prepare phase corresponding to a first set of blocks on the base chain:
identify the first block as an anchor block in a virtual chain;
during a reward phase corresponding to a second set of blocks on the base chain, wherein the second set of blocks are created after the first set of blocks:
(i) determine a set of reward addresses to receive at least some cryptocurrency in a plurality of cryptocurrency associated with the base chain, wherein the set of reward addresses are utilized in a consensus algorithm;
(ii) determine that a first miner device of one or more miner devices submitted a block commit transaction that references a second block in the virtual chain that descends from the anchor block;
(iii) store data indicating that first cryptocurrency in the plurality of cryptocurrency associated with the base chain is transferred from an address of the first miner device to at least one reward address in the set of reward addresses in response to the determination; and
(iv) perform a single-leader sortition that results in a selection of the first miner device to create a new block in the virtual chain.

16. The non-transitory, computer-readable storage claim 15, wherein the computer-executable instructions further cause the computer system to store, during the reward phase, second data indicating that second cryptocurrency in the plurality of cryptocurrency associated with the base chain is transferred from an address of a second miner device of the one or more miner devices to a burn address in response to a determination that the second miner device submitted a second block commit transaction that references a third block in the virtual chain that does not descend from the anchor block.

17. The non-transitory, computer-readable storage media of claim 16, wherein transfer of the second cryptocurrency from the address of the second miner device to the burn address results in the second cryptocurrency being destroyed.

18. The non-transitory, computer-readable storage media of claim 17, wherein the computer-executable instructions further cause the computer system to remove the at least one reward address in the set of reward addresses from the set of reward addresses to form a modified set of reward addresses.

19. The non-transitory, computer-readable storage claim 18, wherein the computer-executable instructions further cause the computer system to store, during the reward phase, second data indicating that second cryptocurrency in the plurality of cryptocurrency associated with the base chain is transferred from an address of a second miner device of the one or more devices to at least one reward address in the modified set of reward addresses in response to a determination that the second miner device submitted a second block commit transaction that references a third block in the virtual chain that descends from the anchor block.

20. The non-transitory, computer-readable storage media of claim 15, wherein the computer-executable instructions further cause the computer system to perform a second single-leader sortition to select the at least one reward address in the set of reward addresses.

\* \* \* \* \*